US006466862B1

(12) United States Patent
DeKock et al.

(10) Patent No.: US 6,466,862 B1
(45) Date of Patent: Oct. 15, 2002

(54) SYSTEM FOR PROVIDING TRAFFIC INFORMATION

(75) Inventors: Bruce W. DeKock; Kevin L. Russell, both of Portland, OR (US); Richard J. Qian, Camas, WA (US)

(73) Assignee: Bruce DeKock, Bend, OR (US)

( * ) Notice: Subject to any disclaimer, the term of this patent is extended or adjusted under 35 U.S.C. 154(b) by 0 days.

(21) Appl. No.: 09/550,476

(22) Filed: Apr. 14, 2000

Related U.S. Application Data
(60) Provisional application No. 60/130,399, filed on Apr. 19, 1999, provisional application No. 60/166,868, filed on Nov. 22, 1999, and provisional application No. 60/189,913, filed on Mar. 16, 2000.

(51) Int. Cl.[7] .............................................. G01S 5/02
(52) U.S. Cl. ..................... 701/117; 701/118; 701/119; 340/901; 340/905; 340/988; 342/357.13
(58) Field of Search ............................... 701/117, 118, 701/119, 213; 342/357, 357.13; 340/901, 905, 988

(56) References Cited

U.S. PATENT DOCUMENTS

| 5,402,117 A | 3/1995 | Zijderhand | 340/905 |
|---|---|---|---|
| 5,497,148 A | 3/1996 | Oliva | 340/905 |
| 5,539,645 A | 7/1996 | Mandhyan et al. | 701/119 |
| 5,594,432 A | 1/1997 | Oliva et al. | 340/905 |
| 5,673,039 A | 9/1997 | Pietzsch et al. | 340/905 |
| 5,774,827 A | 6/1998 | Smith, Jr. et al. | 701/209 |
| 5,812,069 A | * 9/1998 | Albrecht et al. | 340/905 |
| 5,845,227 A | 12/1998 | Peterson | 701/209 |
| 5,889,477 A | 3/1999 | Fastenrath | 340/905 |
| 5,926,113 A | 7/1999 | Jones et al. | 340/906 |
| 5,959,577 A | 9/1999 | Fan et al. | 342/357.13 |
| 5,982,298 A | 11/1999 | Lappenbusch et al. | 340/905 |
| 5,987,374 A | 11/1999 | Akutsu et al. | 701/117 |
| 5,987,377 A | 11/1999 | Westerlage et al. | 701/204 |
| 6,107,940 A | * 8/2000 | Grimm | 340/905 |
| 6,150,961 A | * 11/2000 | Alewine et al. | 340/995 |
| 6,151,550 A | * 11/2000 | Nakatani | 701/117 |

* cited by examiner

Primary Examiner—William A. Cuchlinski, Jr.
Assistant Examiner—Marthe Y. Marc-Coleman
(74) Attorney, Agent, or Firm—Chernoff Vilhauer McClung & Stenzel, LLP

(57) ABSTRACT

A system for providing traffic information to a plurality of mobile users connected to a network. The system comprises a plurality of traffic monitors, each comprising at least a traffic detector and a transmitter, the traffic detector generating a signal in response to vehicular traffic and the transmitter transmitting the signal. A receiver receives the signals from the traffic monitors. A computer system is connected to the receiver and is further connected to the network. The computer system in response to a request signal received from one of the users transmits in response thereto information representative of the signals transmitted by the traffic monitoring units. Alternative systems for gathering traffic information are disclosed.

34 Claims, 14 Drawing Sheets

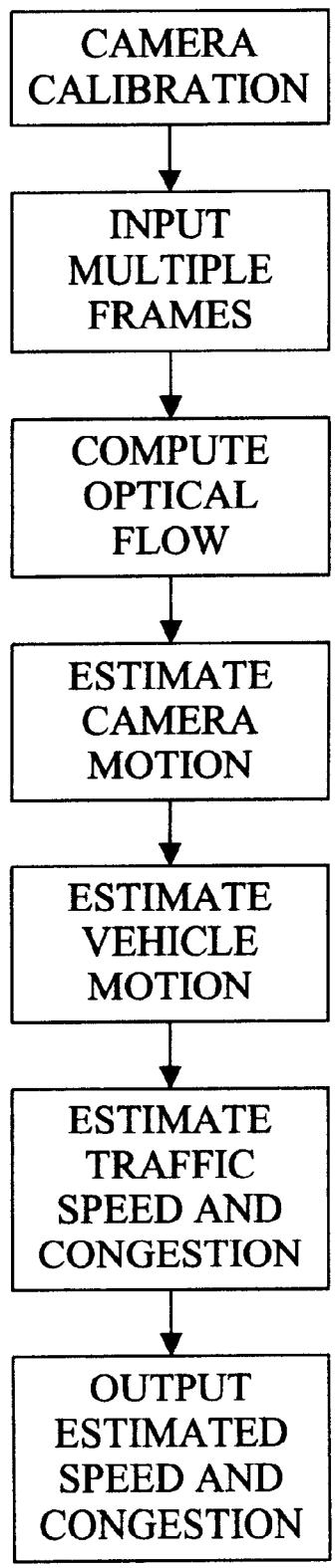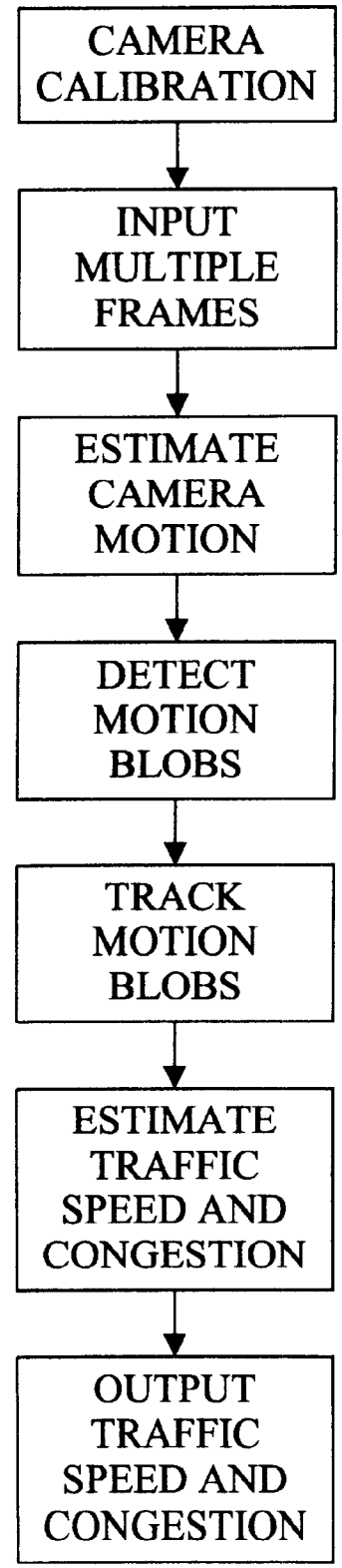
FIG. 9                    FIG. 10

| LOCATION | LAT/LONG | ROAD | DIRECTION | VELOCITY |
|---|---|---|---|---|
| 201 | 45°54'36"N/ 37°32'12"E | INTERSTATE | 0° | 55 MPH |
| 202 | ⋮ | LOCAL | 27° | 20 MPH |
| 203 | | BYPASS | EAST | STOPPED |
| 204 | | RESIDENTIAL | NW | ⋮ |
| 205 | | ⋮ | ⋮ | |
| 206 | | | | |
| 207 | | | | |
| ⋮ | | | | |

FIG. 12

SYSTEM FOR PROVIDING TRAFFIC INFORMATION

The priority date of Provisional Application Serial No. 60/130,399 filed Apr. 19, 1999, Ser. No. 60/166,868 filed Nov. 22, 1999, and Ser. No. 60/189,913 filed Mar. 16, 2000 are claimed.

BACKGROUND OF THE INVENTION

The present invention relates to a system for providing traffic information, and more particularly a system for providing traffic information to a plurality of mobile users connected to a network.

Commuters have a need for information relating to the congestion and traffic which they may encounter on a commute over a road, a highway, or a freeway. Unfortunately, the prior art methods of providing traffic information to commuters do not allow commuters to evaluate the extent to which there is congestion on a highway on which the commuter may wish to travel.

One known method of providing traffic information consists of radio reports. A radio station may broadcast traffic reports, such as from a helicopter that monitors traffic conditions over portions of a freeway. Unfortunately, these reports are usually intermittent in nature. Accordingly, to hear the report, the commuter must be listening to the radio station at the time the report is being broadcast on the radio. Further, the extent of the information provided is severely limited to broad generalizations. For example, the information provided during the broadcast may be limited to the area being currently viewed by the reporter, or the information may be based on a previous view at a prior time of another portion of the freeway. Some broadcasts may include multiple observers of different portions of the freeway, yet these systems also provide incomplete information relating to overall traffic patterns. In addition, the information provided is vague, subjective, and usually limited to broad generalities relating to traffic flow.

Another known traffic information system is provided by television broadcasts. In these systems, television stations may mount video cameras pointed at certain portions of a freeway, or may broadcast video images from a helicopter. The television station may periodically broadcast traffic reports and include in the traffic report a view of different portions of the freeway from the video cameras. Again, this system provides little useful information to a commuter. The commuter must be watching the broadcast at the time the information is being transmitted. However, by the time the commuter actually gets into his vehicle and enters a potentially congested area, the traffic may have changed. Further, the information provided is limited to those areas where the traffic is being monitored and may consist of stale information. Often the video image is limited to a small portion of the road, and shows traffic flowing in a single direction.

Yet another method to provide traffic information is to provide a website that is accessible using the Internet that contains traffic information. While these types of systems have the advantage of providing more up to date information, these systems typically provide a map for a large area. Thus, for a person commuting in a car, the system displays traffic information for many areas not of interest to the commuter. In addition, these types of systems require manipulation by the commuter to find the relevant traffic information. For example, while the map may allow the commuter to zoom in on a particular area, the user must provide inputs to the system to instruct the system to zoom in on a particular area. However, a commuter who is actively driving cannot operate a computer and drive at the same time. In addition, these systems may rely on manual entry of data received from subjective traffic reports and/or traffic sensors. Thus this method may additionally suffer from added cost due to manual labor, incorrect entry of data, and slow response to quickly changing traffic conditions.

Fan et al., U.S. Pat. No. 5,959,577, disclose a system for processing position and travel related information through a data processing station on a data network. In particular, Fan et al. teach the use of a GPS receiver to obtain a measured position fix of a mobile unit. The measured position fix is reported to the data processing station which associates the reported position with a map of the area. Typically, the measured position of the mobile unit is marked and identified by a marker on the map. The area map is then stored in the data processing station and made available for access by authorized monitor units or mobile units. An authorized monitor unit may request a specific area map. This permits shipping companies to monitor the location of their fleet and permits the mobile units to identify their current location in relation to a map, which is particularly suited for the application of navigation to a particular destination. In addition, Fan et al. teach that the measured position data transmitted from the mobile units may be used to calculate the speeds at which the vehicles travel. The collective speed data from the mobile units is then available for use by the monitor units, such as those at the shipping company, to route the vehicles away from traffic congestions and diversions. In this manner, the dispatcher at the shipping company, to which Fan et al. teaches the data is available to, may use the collective speed data to decide which vehicles to contact in order to reroute them.

Westerlage et al., U.S. Pat. Nos. 5,097,377 and 5,987,377, disclose a system for determining an expected time of arrival of a vehicle equipped with a mobile unit.

Zijderhand, U.S. Pat. No. 5,402,117, discloses a method of collecting traffic information to determine an origin-destination matrice without infringing upon the privacy of the users.

Mandhyan et al., U.S. Pat. No. 5,539,645, is related to monitoring movement of traffic along predetermined routes, where individual moving elements can move with a high degree of discretion as to speed except when congestion, accident or the like limit speeds. Mandhyan et al. uses the deployment of calibrant vehicles for collecting and reporting information which describes vehicle speeds actually being experienced along the routes of interest where the data are processed statistically as a function of the time of day. The output provides baseline data against which observations at a particular time, category, weather, event, and location can be compared, to identify the existence of abnormal conditions, and to quantify the abnormality. To determine abnormal conditions, Mandhyan et al. teach the use of probe vehicles. In particular, Mandhyan et al. is applicable to monitoring the flow of motor vehicles along roads which are subject to delays of sufficient frequency and severity that correction action or dissemination of information announcing a delay are economically desirable. Unfortunately, the use of probe vehicles may be expensive and the relevancy of the data is limited to the availability of the probe vehicles.

Lappenbusch et al., U.S. Pat. No. 5,982,298, disclose a traffic information system having servers that makes traffic data, images, and video clips available to a user interface on client devices. Lappenbusch et al. envision that the client devices are personal or desktop computers, network computers, set-top boxes, or intelligent televisions. The user interface includes a road map showing a plurality of road segments that a user can interactively select. Vehicular speed information is provided to the system from traffic sensors monitoring the traffic. In addition, the user interface has a road image area that changes as the user selects different road segments to show recent images of a currently selected road segment. Unfortunately, the system taught by Lappenbusch et al. is complicated to operate and requires significant user interaction to provide relevant data, which is suitable for such "stationary" traditional computing devices.

Smith, Jr. et al., U.S. Pat. No. 5,774,827, disclose a system to alleviate the need for sophisticated route guidance systems, where the commuter has a positioning system as well as a map database in a car. A central facility receives and stores current traffic information for preselected commuter routes from various current traffic information sources, such as local police authorities, toll-way authorities, spotters, or sensors deployed on the road ways to detect traffic flow. To achieve the elimination of sophisticated route guidance systems a portable device receives a travel time only for preselected commuter routes from the central facility. In this manner, Smith, Jr. et al. teach that each user receives only the traffic information that is relevant to the user's preselected commuter routes. If desired, the preselected commuter routes may be presented as a set of route segments, where each of the segments is coded to indicate commute time. In response, the user may choose an alternative route known by him that is different from any preselected commuter routes. Smith, Jr. et al. further suggest that a GPS enabled portable unit for transmitting a present position of the portable device to the central facility such that the central facility uses each present position to calculate at least a portion of the current travel information. By matching multiple positions of the portable device with known positions on the preselected route and measuring the time between two consecutive matched positions the central facility can obtain up-to-the minute traffic information to be used in broadcasting future travel times to other users of preselected commuter routes. Unfortunately, the system taught by Smith, Jr. et al. requires the user to define a set of preselected commuter routes for each route to be traveled, which may be difficult if the user is unfamiliar with the area. In addition, Smith, Jr. et al. teach that the user should select alternative routes that are known to the user, presumably if the commute time of the preselected commuter routes are too long, which is difficult if the user is not already familiar with the area.

Pietzsch et al., U.S. Pat. No. 5,673,039, disclose a system for dynamic monitoring of the total traffic in a stretch of road equipped with monitoring and information-provision system, as well as warnings to drivers, and hence the possibility of regulating the traffic. The system does not require that the vehicles be equipped with appropriate sensors and transmitting equipment.

Akutsu et al., U.S. Pat. No. 5,987,374, disclose a vehicle traveling guidance system that includes data providing devices laid on a road and a vehicle. The vehicle includes a data transmitter for sending a data providing device traveling data of the vehicle when the vehicle passes over the vicinity of the data providing device and a data receiver for receiving data sent from the data providing device. The traveling data may include vehicle pass time or vehicle pass time and speed. The data providing devices laid on the road include a receiver for receiving the traveling data from the vehicle and a transmitter for sending other passing vehicles the traveling data. A control center communicating through the data providing devices laid on the road can use the received traffic data from the vehicles to predict the occurrence of traffic congestion based on the pass time and speed of a vehicle. It is assumed that at a certain point, vehicles were traveling smoothly at a certain time and the speed of each vehicle has decreased drastically at the next time. In this case it is expected that traffic congestion will occur in the vicinity of that point. Therefore, smooth travel can be achieved by, for example, communicating to each vehicle data etc. indicating bypasses in order not to worsen traffic congestion. Therefore, a vehicle operator can gain knowledge of the traveling state of a vehicle which has already passed over that point and adjust travel considering traffic flow.

While all of the above systems provide some degree of traffic information for a commuter, nevertheless the above systems do not provide an efficient method of collecting and presenting objective traffic information to a commuter. What is desired, therefore, is a system for providing traffic information which allows a commuter to obtain information at any time desired by the commuter, that provides information relating to a plurality of points along a road, that provides information relating to different traffic levels, that provides information that is particularly relevant to the commuter, and that provides the information in an easily understood format that may be easily utilized by a commuter while driving.

BRIEF SUMMARY OF THE INVENTION

The present invention overcomes the limitations of the prior art by providing a system for providing traffic information to a plurality of users connected to a network. In a first aspect the present invention provides a system comprised of a plurality of traffic monitors, each comprising at least a traffic detector and a transmitter, the traffic detector generating a signal in response to vehicular traffic and the transmitter transmitting the signal. The system also includes a receiver that receives the signals from the traffic monitors. A computer system is connected to the receiver and is also connected to the network. The computer system, in response to a request signal received from one of the users, transmits in response thereto information representative of the signals transmitted by the traffic monitors.

In a second separate aspect of the invention, a system provides traffic information to a plurality of users connected to a network. Traffic is detected at each of a plurality of locations along a road and a signal is generated at each of the locations representative of the traffic at each of the locations. Each of the signals is transmitted from each of the plurality of locations to a receiver. These signals are sent from the receiver to a computer system. The computer system receives a request from one of the users for traffic information. In response to the request, the computer system transmits information representative of the traffic at each of the plurality of locations to the user.

In a third separate aspect of the invention, a system provides traffic information to a plurality of users connected to a network. The system comprises a plurality of mobile user stations, each mobile user station being associated with the display, a global positioning system receiver and a communicating device to allow each of the mobile user stations to send and receive signals. A computer system is interconnected with another communicating device in the network. The computer system is capable of sending and receiving signals to the mobile user stations using the other communicating device in the network. The computer system maintains a map database and a traffic information database. The traffic information database contains information representative of traffic data at a plurality of locations. At least one of the mobile user stations provides a request to the computer system for information together with the respective geographic location of the mobile user station. In response to the request, the computer system provides to the mobile user station information representative of selected portions of the map database and selected portions of the traffic information database based on the respective geographic location of the requesting mobile user station. The mobile user station then displays graphically on the display information representative of selected portions of the map database and selected portions of the traffic information database.

The traffic information database may be derived from information obtained from stationary traffic monitors, mobile user stations, or a combination thereof. The mobile user station allows traffic information to be displayed in a variety of manners. The display can also show graphically the location of the car on the display. The user may select among different modes for displaying traffic information on the display.

The various aspects of the present invention have one or more of the following advantages. The present invention allows a commuter to obtain traffic information at any time, without waiting for a report to be broadcast. The present invention also allows detailed information relating to traffic conditions based on measurements of the traffic, such as the average vehicular speed or traffic density, to be supplied for a plurality of locations along a road. The invention also allows the convenient display of information in a readily understood form to the user, such as a graphical display.

The foregoing and other features and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 9 is a flow chart for a method of processing video data to yield traffic information.

FIG. 10 is a flow chart for an alternative method of processing video data to yield traffic information.

FIG. 12 is a combined map and traffic information database representative of the road system depicted in FIG. 11.

DETAILED DESCRIPTION OF THE PREFERRED EMBODIMENTS

Figure 1:
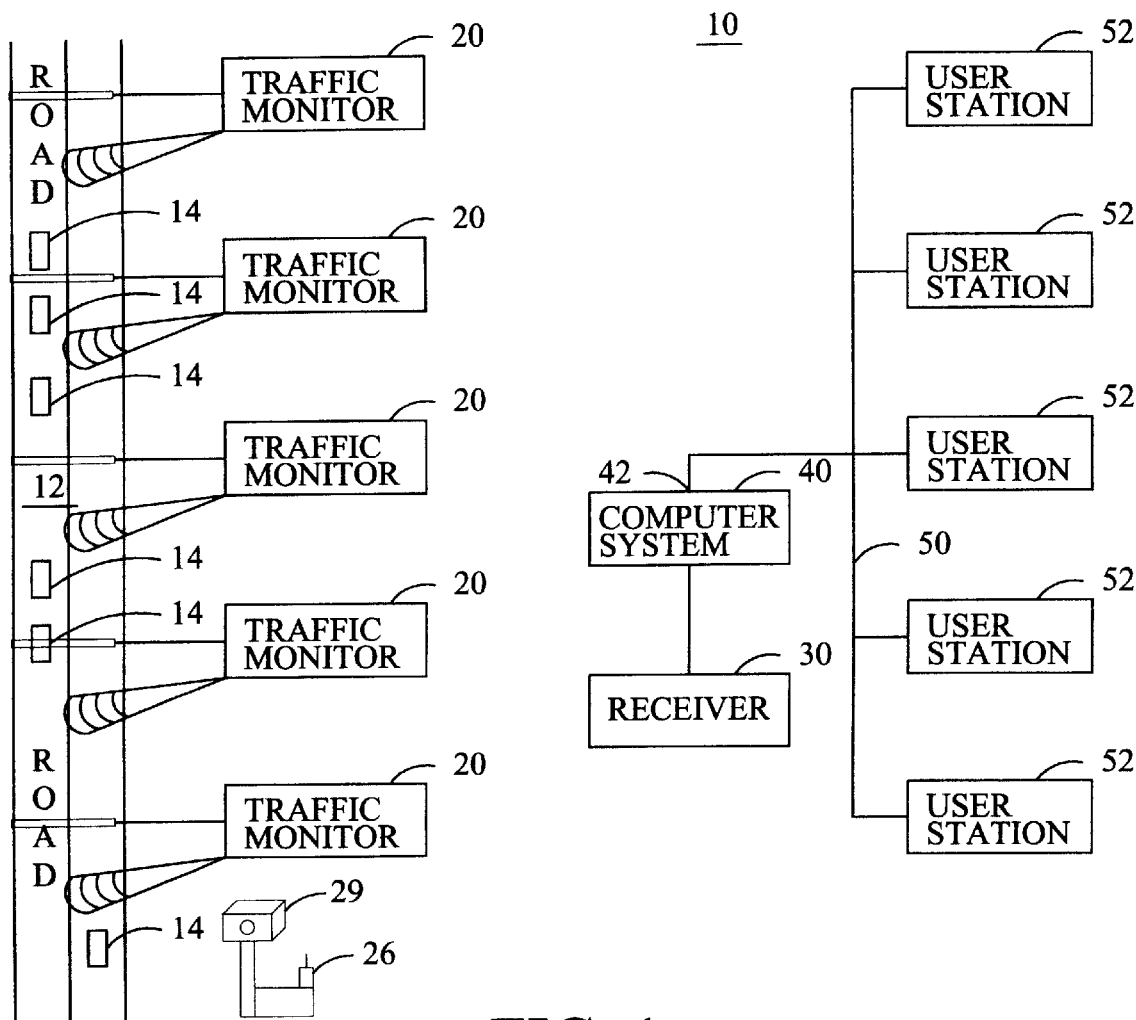
FIG. 1 shows a schematic of an exemplary embodiment of a system for providing traffic information.

Referring now to the figures, wherein like numerals refer to like elements, FIG. 1 shows a schematic diagram of the system 10 for providing traffic information to a plurality of user stations 52 connected to a network 50. A plurality of traffic monitors 20 are arranged at spaced apart locations along a road 12. The traffic monitors 20 measure traffic information by detecting the speed (velocity) or frequency of vehicles traveling along the road (freeway or highway) 12. For example, in one embodiment, the traffic monitors 20 may detect. the speed of individual vehicles 14 traveling along the road 12. Alternatively, the traffic monitors 20 may measure the frequency with which the individual vehicles 14 pass specified points along the road 12.

Figure 2:
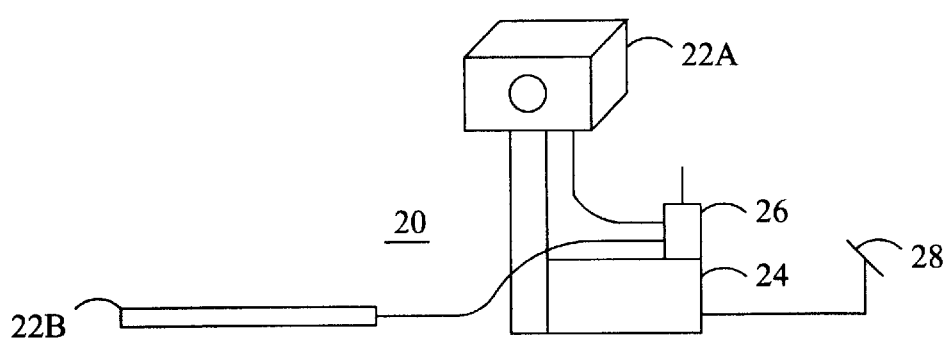
FIG. 2 shows a front elevational view of an exemplary traffic monitor.

FIG. 2 shows a front elevational view of an exemplary embodiment of a traffic monitor 20. The traffic monitor 20 has a detector 22 for measuring or otherwise sensing traffic. FIG. 2 shows two different embodiments 22A and 22B of a detector 22. The detector 22 may be any type of measuring device which is capable of measuring or otherwise sensing traffic and generating a signal representative of or capable of being used to determine the traffic conditions. For example, the detector 22 could measure the average speed of the vehicles (cars or trucks) 14 at locations along the road 12, or it could measure the individual speed (velocities) of each vehicle 14. The detector 22 may detect vehicle frequency, that is, the frequency at which vehicles pass a certain point, or may measure traffic flow, consisting of the number of vehicles passing a certain point for a unit of time (e.g., vehicles per second). The detector 22 may use any suitable technique to measure traffic conditions (data). For example, in one embodiment, the detector 22A could employ radio waves, light waves (optical or infrared), microwaves, sound waves, analog signals, digital signals, doppler shifts, or any other type of system to measure traffic conditions (data). In one embodiment, the detector 22A uses a transmitted beam to measure the velocity of the vehicles 14 passing along the road 12, such as with a commercial radar gun or speed detector commonly used by police. Alternatively, the detector 22A may detect when cars having magnetic tags or markers pass. The detector 22A may either detect signals reflected from the vehicle or signals transmitted by the vehicles.

The traffic monitor 20 is shown with an alternative embodiment 22B consisting of one or more pressure sensitive detectors which extends across the road 12. Preferably two spaced apart detectors are positioned at a predetermined spacing to make the velocity determination readily available. The pressure sensitive detector 22B detects when a vehicle passes over the detector 22B. Such a pressure sensitive detector may be used alone or in combination with detector 22A to measure the frequency or speed (velocity) of the traffic passing along the road 12. Likewise, the detector 22A may be used alone or in combination with the detector 22B to measure the frequency or speed (velocity) of the traffic passing along the road 12. Alternatively, detector 22B could be a wire loop buried in the road to measure changing magnetic fields as vehicles pass over the loop.

The detector 22 may measure traffic conditions in a single lane of a freeway or road, or may measure average traffic information across several lanes. The detector 22 could also be embedded in each lane of a road or freeway, such as with a pressure sensitive detector 22B. Alternatively, individual detectors could be embedded in a roadway which would sense signals or conditions generated by passing vehicles. For example, each vehicle could include a magnet or could include a signaling device which would be detected by the detector, which could be an electromagnetic sensor or a signal receiver.

Figure 5:
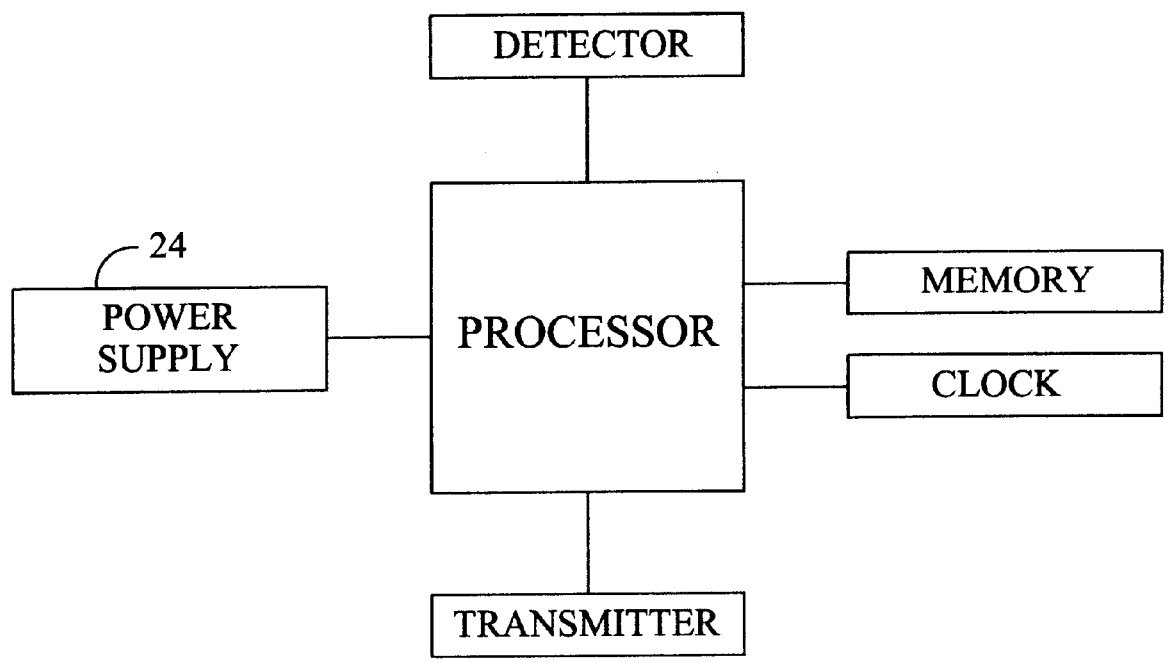
FIG. 5 is a partial electrical schematic for a traffic monitor of FIG. 2.

Referring to FIG. 5, the traffic monitors 20 may also include a processor and a memory for collecting, processing, and storing traffic information provided by the detector 22.

The traffic monitor 20 preferably further includes a transmitter 26 for transmitting the traffic information collected by the detector 22. The transmitter 26 may be any type of device capable of transmitting or otherwise providing data in either digital or analog form, either through the air or through a conductor. For example, the transmitter could be a digital or analog cellular transmitter, a radio transmitter, a microwave transmitter, or a transmitter connected to a wire, such as a coaxial cable or a telephone line. The transmitter 26 is shown as transmitting the signals through the air to a receiver 30. Alternatively, the transmitter 26 could transmit the data to an intermediate receiver before being transmitted to the receiver 30. For example, several traffic monitors 20 could transmit traffic information in a daisy chain manner from one end of a road 12 to the last traffic monitor 20 at the other end of the road before being transmitted to receiver 30. To facilitate this type of transmission most traffic monitors 20 would require a receiver. Alternatively, one or more traffic monitors 20 could transmit data to other traffic monitors 20, which in turn transmit the data to the receiver 30.

In order to conserve power, the transmitter 26 and the detectors 22 preferably transmit and sense information periodically rather than continuously. Further, the traffic information generated by the detector 22 is preferably averaged, or otherwise statistically modified, over a period of time so as to limit the amount of data that needs to be transmitted and increase its accuracy.

In one embodiment, the traffic monitoring unit 20 may further include a video camera 29. The video camera 29 is also connected to the transmitter 26, so that the transmitter 26 may transmit signals corresponding to the image sensed by the video camera 29. Alternatively, the traffic monitors 20 may be replaced by video cameras 29. Multiple images may be obtained by a video camera and the speed of the vehicles 14 determined based on image analysis of multiple frames from the video camera(s).

One preferred type of monitor 20 utilizes signals from a digital video camera to provide the traffic information. Traffic-related information may be obtained by analyzing the video sequences from the monitoring video cameras 29. The information may include how fast the traffic moves and how congested the road is. The speed of the traffic may be derived by measuring the speed of vehicles in the video. The degree of congestion may be estimated by counting the number of vehicles in the video. This invention provides two algorithms for estimating traffic speed and road congestion based on video input.

The first algorithm is based on optical flow and its flow diagram is shown in FIG. 9. First, the algorithm performs camera calibration based on the input video of the road and the physical measurements of certain markings on the road. Then the algorithm (1) takes a number of frames from the input video; (2) computes optical flow; (3) estimates camera motion which may be caused by wind, etc., (4) estimates independent vehicle motion after compensating the camera motion; (5) estimates traffic speed based on the averaged vehicle motion and the camera parameters obtained from the camera calibration step; estimates road congestion by counting the number of independent motion components; and (6) outputs the estimated speed and congestion results.

The second algorithm is based on motion blob tracking and its bock diagram is shown in FIG. 10. First, the algorithm performs camera calibration based on the input video of the road and the physical measurements of certain markings on the road. The algorithm (1) takes a number of frames from the input video; (2) estimates camera motion; (3) detects independent motion blobs after compensating the camera motion; (4) tracks motion blobs; (5) estimates traffic speed based on the averaged blob motion and the camera parameters obtained from the camera calibration step; estimates road congestion by counting the number of independent motion blobs; and (6) outputs the estimated speed and congestion results.

Traffic monitor 20 further includes a power supply 24. The power supply 24 is preferably a battery, or may alternatively be a power line, such as a 12 or 120 volt power line. The traffic monitor 20 is shown with an optional solar power supply 28. The power supply 24 or 28 provides the power necessary for the detectors 22A and/or 22B, the transmitter 26, and any other electronics, such as a computer system and/or video camera.

The receiver 30 receives the signals from the traffic monitors 20 and/or video cameras 29. The receiver 30 may be any device capable of receiving information (data) such as in either an analog or a digital form. For example, the receiver 30 may be a digital or analog cellular receiver, a standard phone, a radio receiver, an antenna, or a data port capable of receiving analog or digital information, such as that transmitted pursuant to a data protocol.

The receiver 30 receives the information from the traffic monitors 20 and/or video cameras 29 and passes that information to a computer system 40. The computer system 40 preferably includes a processor (such as a general purpose processor, ASIC, DSP, etc.), a clock, a power supply, and a memory. The computer system 40 preferably has a port 42, or any type of interconnection, to interconnect the computer system 40 with the network 50. Preferably, the computer system 40 includes information representative of the road 12 along which the traffic monitors 20 are located, such as a map database. The computer system 40 receives the traffic information transmitted by the respective traffic monitors 20. The information transmitted by the traffic monitors 20 includes the location or identification of each particular traffic monitor 20 together with the data representative of the traffic data provided by the detector 22 and/or video camera 29 at each traffic monitor 20. The computer system 40 may manipulate the traffic information in some manner, as necessary, so as to provide average speeds or other statistical data. In the event of video, the computer system 40 may process the images to determine the speed of vehicles. Also, the video may be provided. Alternatively, the user stations may process the traffic information.

In one embodiment, both the receiver 26 of the traffic monitors and the transmitter 30 of computer system are each capable of receiving and transmitting data. This allows for two way communication between the monitor 20 and the computer system 40. Thus, the computer system 40 could remotely operate the traffic monitor 20 to change settings, diagnose problems, and otherwise provide input to traffic monitor 20 to facilitate collection of traffic data. For example, the video camera 29 could be remotely positioned to view a traffic lane of interest.

Traffic information may be provided to users in any suitable manner, such as the examples that follow. A user station 52 is connected to the network 50. Preferably, the user station 52 includes a graphic display unit 54 (see FIG. 3). For example, the user station 52 may be a standard personal computer with a display monitor 54. The network 50 is preferably the Internet. However, the network 50 could also be a local area network or any other type of closed or open network, or could also be the telephone network. The user station 52 sends a signal over the network 50 to the computer system 40 requesting traffic information. In response to receiving a request from the user station 52, the computer system 40 transmits traffic information representative of the traffic information collected by the various traffic monitors 20 to the requesting user station 52. The computer system 40 may transmit average speeds detected by each of the traffic monitors 20 at each of their respective locations. The traffic information may be presented to the user as a web page. The computer system may send traffic information corresponding to only some of the traffic monitors. The user may select which portions of the road 12 are of interest, and the computer system 40 may transmit traffic information corresponding to that portion of the road 12.

Figure 3:
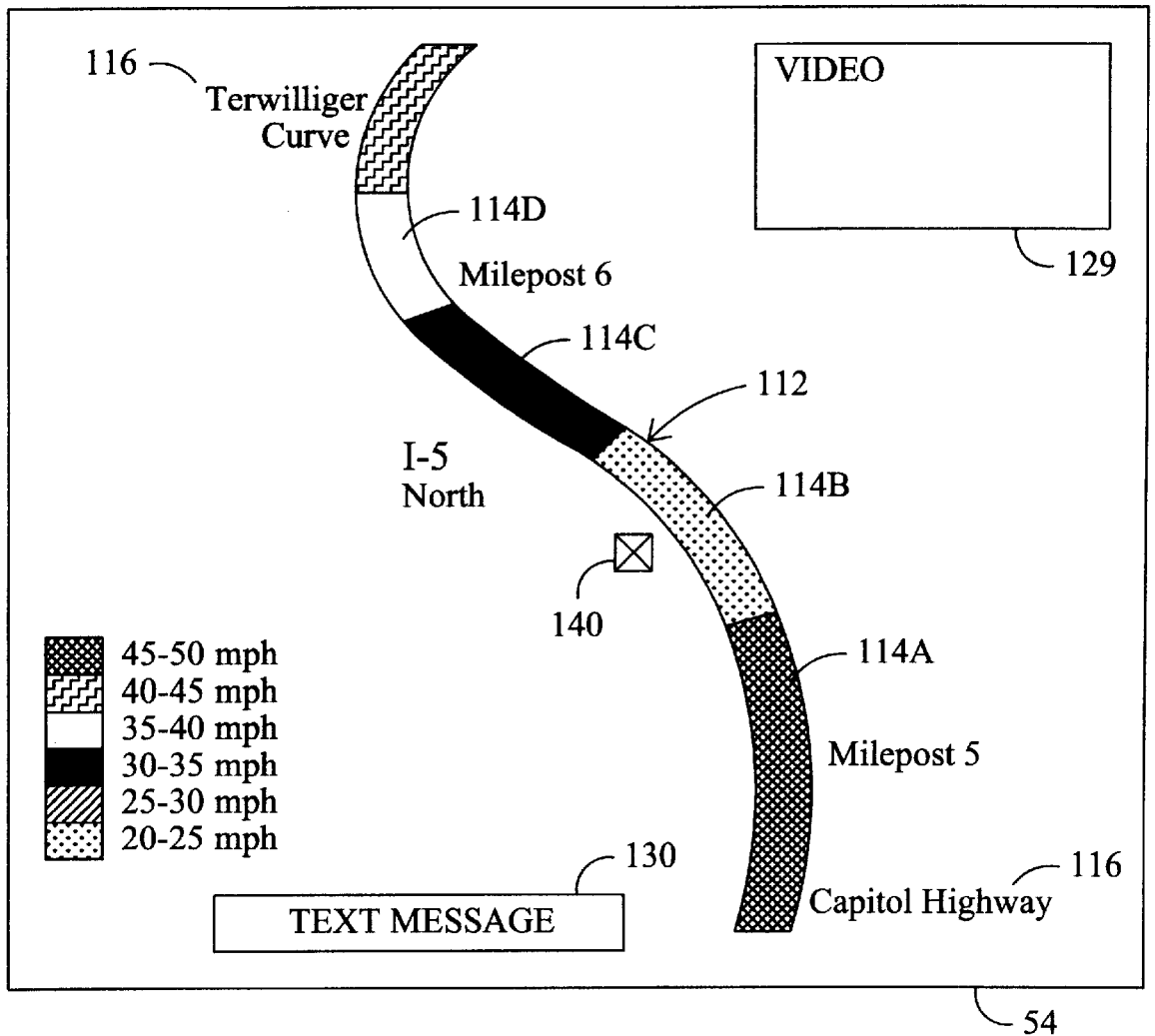
FIG. 3 shows an exemplary display for a user station.

FIG. 3 shows an exemplary display 54 displaying the traffic information provided by the computer system 40. The computer system 40 provides data from its memory which is representative of the road 12, such as data from a map database, which is displayed as a road 112 on the display 54. The computer system 40 also provides traffic information collected by each, or a selected set, of the respective traffic monitors 20 which is displayed in portions 114a–114d and/or the traffic information derived from individual mobile user stations having a global positioning system locator as described in detail below. In the exemplary display shown in FIG. 3, the portions 114a–114d display different colors or patterns representative of average vehicle speeds (for example, in miles per hour) along different portions of the road 112. Of course, the display may display other types of information, such as traffic flow (vehicles per second) or vehicle frequency. The display 54 may include information in either graphical or text format to indicate the portion of the road displayed, such as location of milepost markers or place names 116.

While the display 54 shows one format for displaying the information, other formats for presenting the information may likewise be used, as desired. It is not necessary to provide a graphical representation of the road 12. Instead, information could be provided in a textual manner, such as, for example, mile post locations for each of the traffic monitors 20 and presenting textual traffic information for each location.

Thus, the system may operate as follows. The traffic monitors 20 detect or otherwise sense traffic to provide traffic information. The traffic monitors 20 may detect or otherwise calculate vehicle speed, average vehicle speed, traffic flow, vehicle frequency, or other data representative of the traffic. The traffic monitors 20 may sample either continuously, or may sample at intervals to conserve power. The transmitter 26 transmits the signals provided by the traffic monitors 20 to the receiver 30 either continuously or at intervals. Such signals may be either transmitted directly to the receiver 30, or may be transmitted through other traffic monitors 20. The receiver 30 receives the signals received by the various traffic monitors 20 and passes these signals to the computer system 40. The computer system 40 receives the data from the traffic monitors 20. The computer system may calculate or process the traffic information for the users, as necessary. It is not necessary for the traffic monitors 20 to calculate traffic data, if desired. In response to a request from a user station 52, the computer system 40 provides the traffic information over the network 50 to the user station 52.

The system 10 has many advantages. It allows a user to receive contemporaneous traffic information from a plurality of locations. It allows the user to obtain immediate information rather than waiting for the broadcast of information at specified times. Further, the amount of information provided by the system is far superior to that provided by any other traffic reporting system. A user can obtain immediate and contemporaneous traffic conditions, such as average vehicular speed, traffic flow, or vehicle frequency, for a plurality of locations along a road. Where traffic monitors are provided along several different roads, a commuter may then select among the various alternative routes, depending on the traffic conditions for each road. The system also does not rely on the manual input of information, and thus provides information more accurately and more quickly. It also eliminates subjective descriptions of traffic information by providing measured data representative of traffic conditions.

In one embodiment, the computer system 40 also receives the signals generated by the video cameras 29 at the respective traffic monitors 20. FIG. 3 shows an exemplary display 54 in which a video image 129 is provided. In this embodiment, the user may select from which traffic monitoring unit 20 the video image 129 is to be received from. For example, a user could initially select to view the image generated by the video camera at a first location, and then later view the image transmitted by another video camera 29, preferably at another traffic monitor 20, at a different location.

The system 10 preferably further includes the ability to send messages about road conditions. FIG. 3 shows such an exemplary message 130 in text format. The computer system 40 is capable of storing data messages and transmitting the data messages with the traffic information. The data messages would indicate items of particular interest to the commuter. For example, the text message 130 could indicate that there was an accident at a particular location or milepost, that construction was occurring at another location or milepost, or that highway conditions were particularly severe and that alternative routes should be selected. The system 10 could provide multiple messages through which the user could scroll so as to receive different messages in addition to the traffic information received from the various traffic monitors 20. In another embodiment, the user station 52 includes a voice synthesizer capable of reading the messages to the user.

In yet another embodiment, the system 10 may also provide additional graphical information relating to traffic conditions. For example, the computer system 40 could transmit the location of an accident or construction site along the road 12. The information would be displayed on display 54 as an icon or other symbol at the location indicating the presence of an accident or highway construction. Such an icon is shown at 140 in FIG. 3. Alternatively, the computer system could also display an icon representative of a restaurant, gas station, hospital, rest area, or roadside attraction. In such a system, the computer system would contain or be linked to a database containing such information. The information could be displayed automatically, or in response to a request for such information from a user.

In another exemplary embodiment, the computer system 40 automatically generates traffic reports to be sent to the user station 52 at predetermined times. For example, a user may indicate that it wishes to receive a traffic report every morning at 7:30 a.m. The computer system 40 automatically sends to the user station 52 at the predetermined time (7:30 a.m., for example) the traffic information collected from the traffic monitoring units 20. The information could be sent to be displayed, such as in FIG. 3, or could be sent alternatively in a text or graphical format via e-mail. The traffic report may also be provided in a format specific to the user's geographic region and/or user's driving habits, such as anticipated (potential) route to be traveled. The computer system 40 may also automatically send the traffic information to a display in the user's vehicle in response to some event, such as turning on the vehicle, time, key press, etc.

In another embodiment, the computer system 40 allows a user to calculate the amount of time necessary to travel from one location to another location along the road 12. The user sends a request to the computer system 40 indicating the two locations along the road along which travel is desired. The user may, for example, indicate on the display by highlighting the two locations on the road 112 using a computer mouse. Alternatively, the two locations may include the user's current location, as determined by a vehicle based GPS system, so that only the destination needs to be entered. The computer system 40 then calculates the anticipated amount of time it will take to travel from one point to the other point based upon the traffic data collected by the various traffic monitors 20 between the two locations. In addition, the system may calculate alternative routes in order to determine the fastest route in view of the traffic information. The computer system 40 then sends a signal back to the user station 52 to indicate the amount of time that the travel from the first to the second location will take. The route determined as the best may be overlaid on a map to assist the user in travel.

Figure 7:
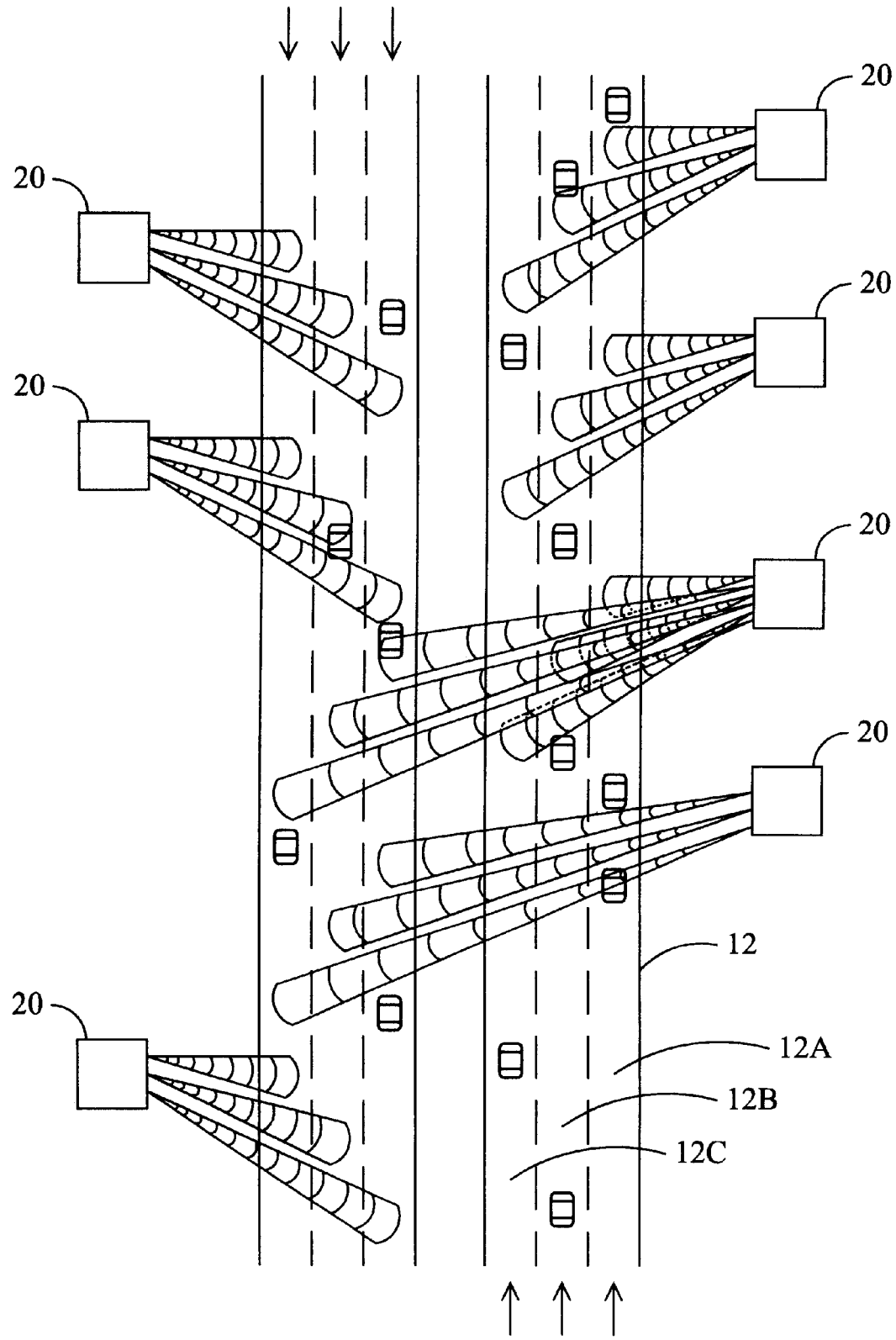
FIG. 7 shows a schematic view of another is exemplary embodiment of a series of traffic monitors along a road.

In yet another embodiment of the invention, FIG. 7 shows a divided freeway with vehicle traffic flowing in opposite directions in each of the divided sections. Each section of the freeway 12 has multiple lanes 12A–12C. The traffic monitors 20 measure traffic in each of the lanes 12A–12C of each section 12 of the divided freeway. The monitors 20 may measure traffic on only one portion of the divided freeway, or may measure traffic conditions in each of the lanes of each of the sections of the divided freeway. The monitor used to measure traffic in multiple lanes may be a digital video camera.

Figure 8:
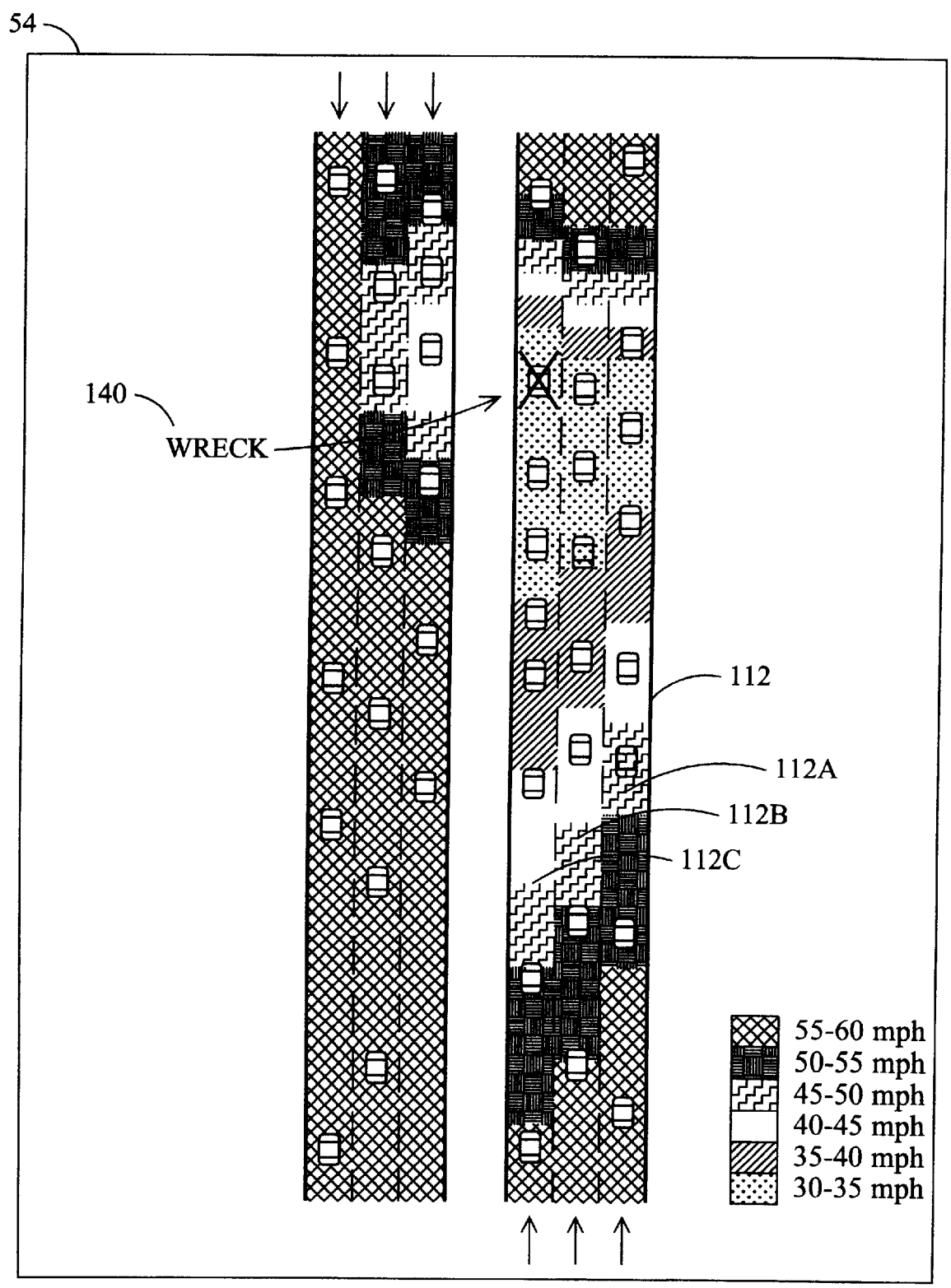
FIG. 8 shows another exemplary display for a user station.

FIG. 8 shows yet another embodiment of a display 54, which displays traffic information for each individual lane of the divided freeway shown in FIG. 7. For example, in display 54, the traffic conditions in each individual lane 112A–112C is displayed for the road section 112. By displaying conditions for each particular lane, the system has the advantage of allowing the user to anticipate particular lane problems which may occur ahead, such as a wreck 140 in lane 112C. In addition, in an alternative embodiment, the display 54 is capable of displaying the individual location of each individual vehicle on the road 112.

Figure 4:
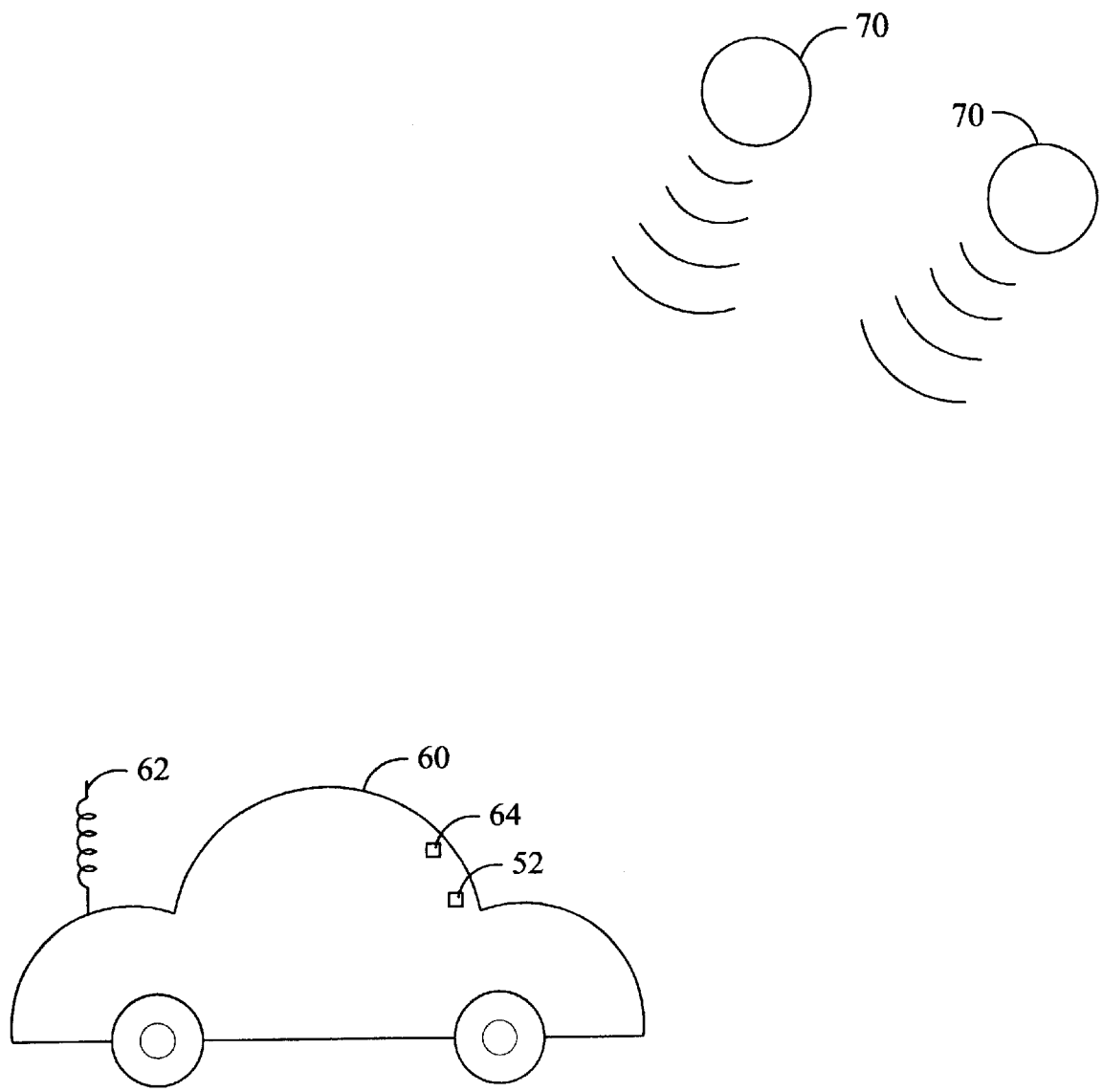
FIG. 4 shows a schematic view of an exemplary embodiment of a mobile user unit of the present invention.

FIG. 4 shows an alternative embodiment of a user station 52. User station 52 is a mobile unit in a car 60. User station 52 has transmitting and/or receiving units 64 for communicating with the network 50. Such transmitting and receiving units 64 may be any devices capable of transmitting digital or analog data, such as, for example, a digital or analog cellular phone.

The user station 52 may also be contained within a car 60 that further includes an associated global positioning system (GPS) receiver 62. The GPS receiver 62 receives signals from GPS satellites 70 which enable the GPS receiver to determine its location. When a commuter requests traffic information using the mobile user station 52, the request for traffic information may include the location of the user as determined by the GPS receiver 62. When the computer system 40 receives this request, it provides traffic information back to the mobile user station 52 based on the location of the car 60 as provided by the GPS receiver 62. Alternatively, the computer system 40 may provide traffic information to the user station 52 which in combination with the position determined by the GPS receiver 62 displays suitable data to the user on a display or audibly. The user station may also be a cellular phone with an integrated or associated GPS.

Figure 6:
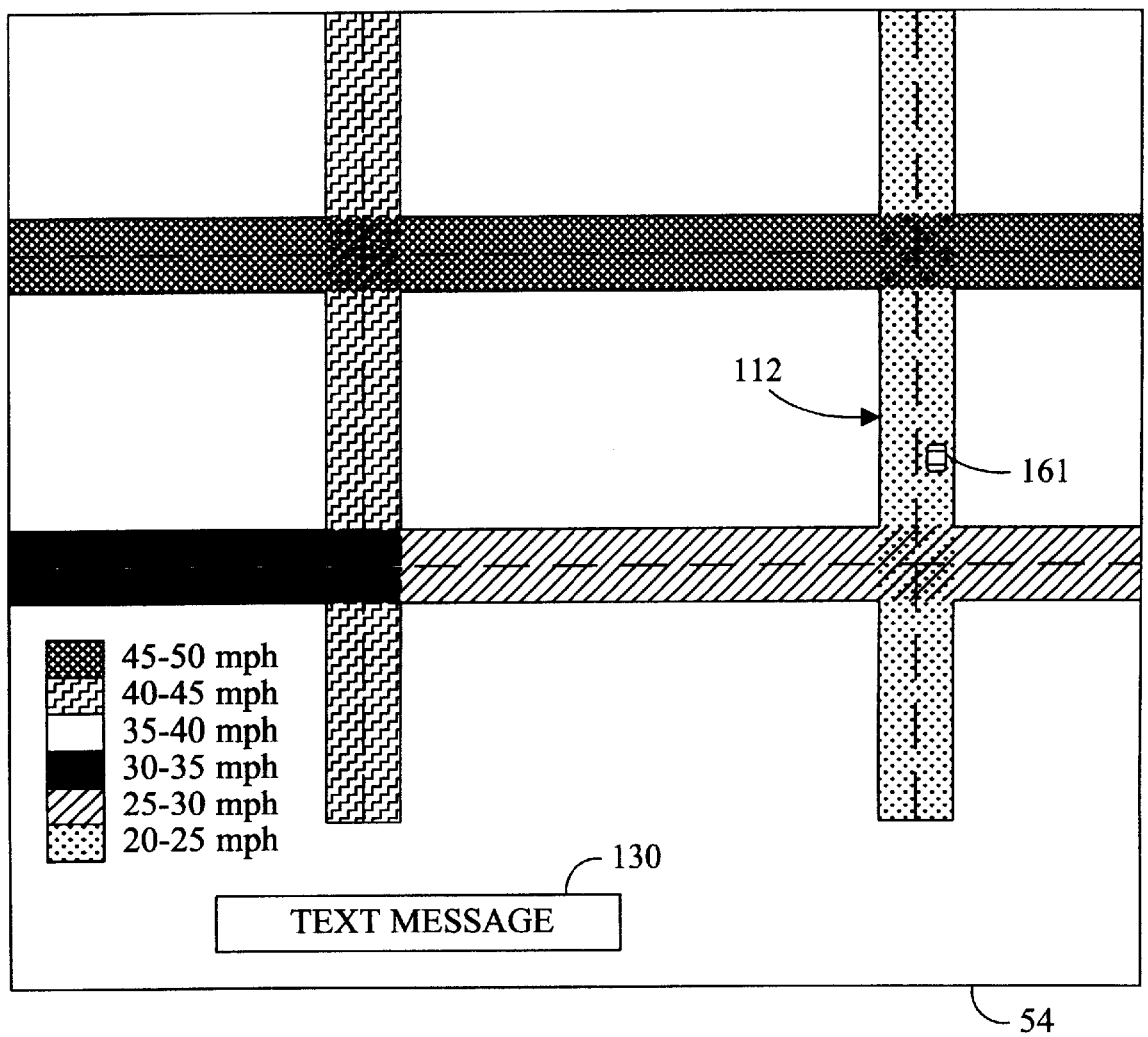
FIG. 6 is an alternative exemplary display.

FIG. 6 shows a representative display of the traffic information provided by the computer system 40. The information provided is essentially the same as that shown in FIG. 3, except that the display 54 contains at 161 the position of the car 60. The mobile user station 52 provides a significant advantage in that it allows the commuter to immediately determine traffic information in the commuter's immediate vicinity based on the commuter's present location. The commuter does not have to wait for a periodic traffic report. Further, traffic conditions are provided at a plurality of locations, and the information is contemporaneous. Based on the receipt of such information, the commuter may decide to use an alternate route rather than continue on the current freeway.

Thus, in the embodiment shown in FIG. 4, the system provides the relevant traffic information to the commuter or user on a timely basis. The display may be tailored to provide the information for the current location of the commuter, together with the upcoming traffic that lies ahead.

In a preferred embodiment, the system obtains traffic information from users that have a GPS receiver 62. In this system, whenever a user station 52 requests traffic information from the computer system 40, the computer system 40 associates a velocity (speed) of that particular user with its current location. The velocity may be determined through a variety of methods. In one system, when the user requests traffic information, the user station 52 supplies not only its location but also its current velocity. The user station 52 may obtain its current velocity in any fashion. For example, the user station 52 may track its location over time using the GPS receiver 62, and also keep track of the time associated with each location by using an internal clock. The velocity could then be calculated by simply dividing the difference between respective locations by respective times. Alternatively, the user station 52 may be connected to the vehicle's speedometer or odometer, and measure velocity using information provided by the vehicle 60 itself. Alternatively, the computer system 40 itself could calculate the velocity of each user. In such a system, each user station 52 would provide the computer system 40 with a unique identification code together with its location. The computer system 40 then associates a time using an internal clock with each location reported by each user. Preferably, the GPS location is sent together with the current time at the user station so that delays incurred in transmission do not change the result. The velocity of each user could then be calculated by calculating the difference in location for a particular user (identified by its unique identification code) by the respective times associated with each of these locations.

Thus, the computer system 40 develops a database consisting of the location of a plurality of users together with the respective velocities of each of the users. The computer system 40 thus has traffic information consisting at least of the velocity of the traffic for a plurality of locations corresponding to the locations for each of the reporting users. It is preferred in such a system that each user station 52 would contribute to the database, but the computer system could use data from fewer than all of the user stations 52 either requesting information or operating. The system may thus use the information received from the user stations 52 either to calibrate the traffic information provided by monitors 20, or to supplement the traffic information provided by the traffic monitors 20. Alternatively, where the number of users is sufficiently large, the traffic monitors 20 may no longer be necessary, because the users themselves through mobile user stations 52 and GPS receivers 62 provide enough traffic information to generate useful displays of traffic information. Thus, the system may provide traffic information without the use of monitors 20 at all, relying solely on information derived from the mobile user stations 52. With a large number of users at a plurality of different locations, the computer system 40 would develop a database having a large number of velocities associated with a large number of geographic locations. Ideally, if every commuter on a road had a user station 52 with a GPS receiver 62, the computer system 40 would provide not only velocity data but also traffic density or traffic frequency data. Even without every vehicle having a user station 52 providing data to the computer system 40, traffic density or traffic frequency could be calculated using statistical techniques that correlate the reporting user stations 52 with known traffic patterns.

Thus, the combination of the mobile user station 52, GPS receiver and transmitting and receiving units 64 provides an especially advantageous method for collecting traffic information. Surprisingly, this system is capable of providing traffic information that is superior to that collected by stationary sensors. This is because traffic information may be potentially collected at more locations based on the number of mobile user stations 52, and because individual vehicle speed can be monitored rather than average vehicle speed. In addition, the system has a significant cost advantage in that it is not necessary to install traffic monitors 20, or at least the number of traffic monitors 20 that are necessary can be substantially reduced. The system also provides automatic traffic reporting, and thus does not rely on the manual input of data. Furthermore, the system is low maintenance, since there are no traffic monitors 20 to maintain. The system is also particularly robust, in that if a particular mobile user station 52 malfunctions, traffic information can still be collected for all locations based on data reported by other mobile users. In contrast, if a stationary sensor 20 fails, no data can be collected from that location. Thus, the collection of traffic data from a plurality of mobile user stations 52 to create a traffic information database provides surprising advantages and a superior system for providing traffic information.

In the system described above using mobile user stations 52 in vehicles, the user station may initiate contact with the computer system 40 by initiating a telephone call to the computer system 40. Alternatively, the computer system 40 could initiate a call to the user station 52, such as over the Internet using a web browser. The user station 52 would respond with an appropriate signal if information was requested. The user station 52 could also, even if no information was desired, provide its current location (preferably with current time), and optionally its velocity as well, to allow the computer system 40 to gather additional traffic information. This would be useful in the case of vehicle based Internet browsing for other purposes so that the traffic information would be updated for that user and others. In yet another alternative, the user station 52 would initiate the request to the computer system 40, indicating that traffic information was desired. The computer system 40 would then respond at a series of timed intervals for a set length of time, for example, providing updates every two minutes for thirty minutes.

In yet another alternative embodiment of the system 10, the mobile user station 52 is a cellular telephone. The computer system 40 includes a voice synthesizer. A user may telephone the computer system 40 over a cellular telephone network. In response to a request for highway conditions, the computer system 40 generates a traffic report and transmits the information using the voice synthesizer so that the traffic information may be heard and understood over the commuter's cellular telephone. The location of the user may be determined by an associated GPS receiver, or alternatively by triangulating the location of the user by measuring the distance between the user and several different transmission receiving towers in different cells.

In yet another embodiment of the present invention the computer system 40 or user station 52 may calculate the best route, such as the fastest, between a starting point and a destination based on the current traffic conditions. This functionality may further be provided in the mobile user station 52 in the car 60 so that the driver may calculate the best route to accommodate for changing traffic conditions. This also assists the driver in unfamiliar cities where he may be unfamiliar with anticipated traffic patterns. The functionality of providing current traffic conditions and/or best route calculations may be overlaid on maps available for GPS systems, household computers, and mobile user stations.

In addition, an early warning system may be incorporated into the computer system, user station, or mobile user station to provide warning of impending traffic jams, such as the result of a traffic accident. For example, if the average vehicle speed on a portion of a road ahead of a driver is less than a preselected velocity, such as 25 mph, the computer system 40 may send a warning signal to the mobile user station 52. Alternatively, a velocity less than a preselected percentage or other measure of the anticipated velocity for the particular road may be used as the warning basis. It is also envisioned within the scope of the invention that data communications may be accomplished using radio broadcasts, preferably encoded in some manner.

Preferably, the computer system 40 and/or the mobile user station 52 in a vehicle 60 has stored in its associated memory a map database representative of the road or highway network that contains longitude and latitude information associated with various geographic locations on the map. This allows easy integration of traffic data that has associated longitude and latitude information. For example, along a particular section of a highway, the map database contains the latitude and longitude of selected locations of the highway. The latitude and longitude of the various traffic sensors 20 may be predetermined. When data representative of the traffic at a particular sensor 20 is received, the computer system 40 can easily display the traffic information for that particular location on the map by associating the geographic location of the sensor 20 with the longitude and latitude information contained in the map database. Similarly, where traffic information is derived from individual mobile user stations 52 in vehicles 60 which report latitude and longitude derived from the mobile GPS receivers 62, the computer system 40 can easily associate the traffic information received from the mobile user station 52 with the map database based on the user's reported latitude and longitude. Thus, by utilizing a map database that contains latitude and longitude information for various locations, the system can easily overlay traffic information on top of the displayed map data by associating the geographic data (latitude and longitude) corresponding to the traffic information with the geographic data corresponding to the map.

Figure 11:
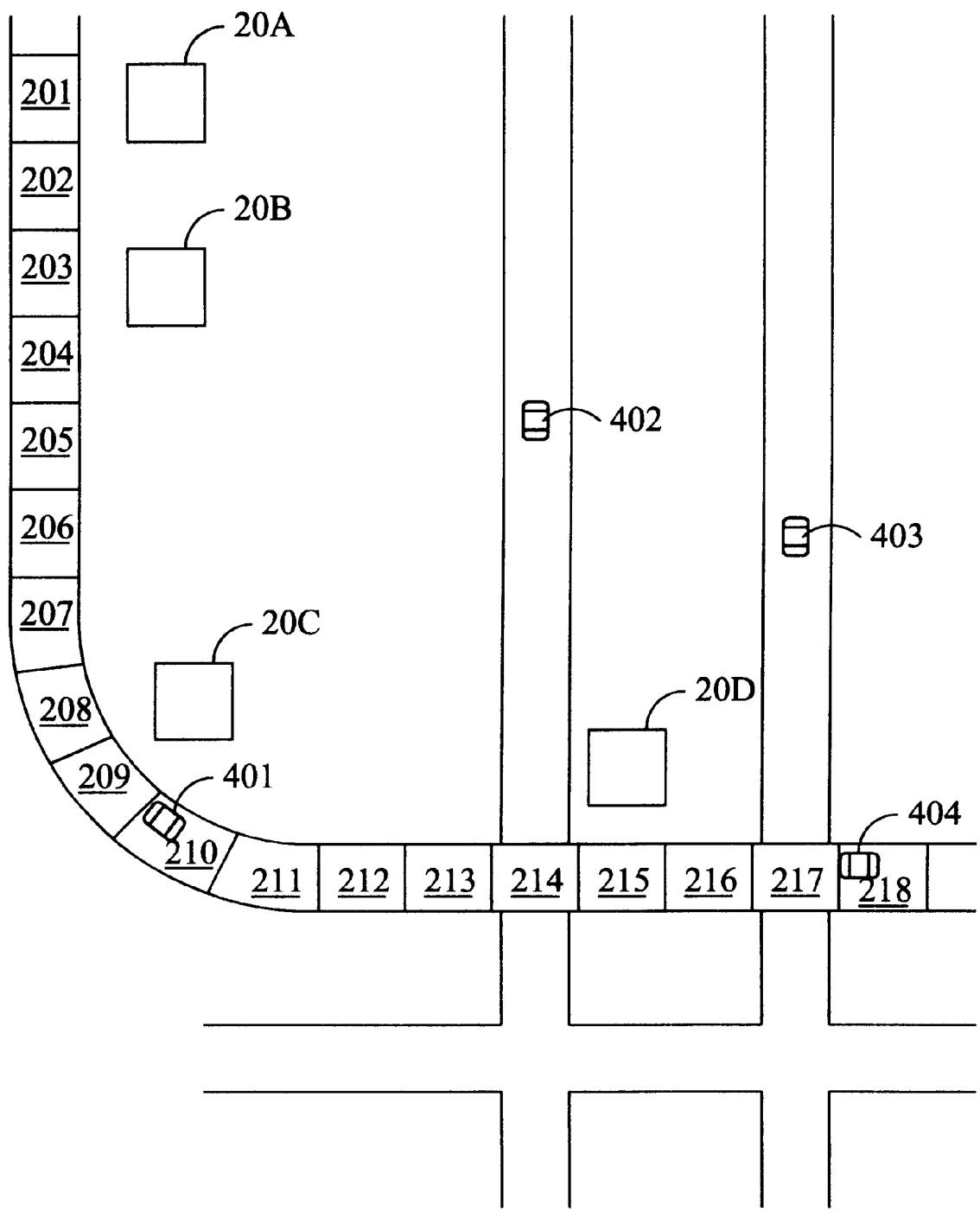
FIG. 11 is a schematic representation of a road system having traffic sensors and vehicles at different locations along the road.

FIGS. 11 to 12 illustrate such a system. FIG. 11 shows schematically a section of a road having various locations 201–218. Along the road are positioned various sensors 20a–20d whose geographic locations have been determined. Traveling along the road are a variety of users 401–404 having respective user stations and GPS receivers. FIG. 12 illustrates one embodiment of a map and traffic information database that may be developed to provide traffic information over the network to individual users. Each of the various locations (or road segments) 201–218 has an associated longitude and latitude. In addition, the database may optionally contain the associated road, as well as optionally the direction that traffic moves at that location (for example, using a 360 degree compass, 0 degrees would represent straight north while 90 degrees would represent straight east). The database also includes traffic information, such as the average vehicle velocity calculated for that location. Thus, for example, referring to FIG. 11, the traffic monitor 20a may be used to provide the vehicle velocity for location 202. User 401 may be used to provide the vehicle velocity at location 210.

Of course, while a database has been illustrated that combines both map and traffic information, the system could use two or more databases containing portions of the information, such as a separate map database and a separate traffic information database. An example of a map database useful with such a system is Etak Map® from SONY®. The map database could reside on either or both the computer system 40 or the mobile user station 52.

When a user requests traffic information from the computer system 40, the computer system 40 transmits the requested data based on either the geographic location of the user, or for the geographic location requested by the user. The computer system 40 either sends the raw traffic data requested by the user, or sends a signal representative of the map and/or traffic database which may be used by the user station 52 to represent the map and traffic information on the display 54.

The advantage of using a map database that contains longitude and latitude information associated with various locations on a map is that the system allows easy and automatic integration of traffic information, either to a database or for display. Thus, traffic information may be collected from an individual user who provides the longitude and latitude for that user based on information derived from the user's GPS receiver 62. The computer system then matches the location of the user to the map database based on the received longitude and latitude information. The computer system 40 can then overlay the traffic information data received from the user onto the map database based upon the provided longitude and latitude information. Thus, the system allows traffic information to be updated for a map database, even though the routes of the individual users are not predetermined. In other words, it is not necessary to know the particular route of an individual user in order to collect useful traffic information and to update a traffic information database.

The traffic information database may be configured to provide traffic information to optimize the analysis of traffic information both by location and time. The spacing of the locations for which traffic information is associated may be either every half-mile, mile, etc. The spacing depends on the locations of ground based traffic monitors and the number of cars traveling through a particular spacing. If, for example, there are traffic monitors spaced every half-mile, then the traffic information database may report traffic information for each of those locations. However, for a section of road that does not have traffic monitors, the spacing of the locations associating traffic information depends on the frequency of vehicles passing along the highway and which are reporting traffic conditions. For example, where the traffic density is high, there will be a large number of vehicles from which to gather data, and accordingly the spacing between locations may be small, such as ¼ mile. However, where the traffic density is low, there may be few vehicles from which to gather data, and thus the spacing may be large, such as 3 miles. The traffic information database may be configured so that the spacing is optimized based on the ability to collect data for different areas. Thus, for a section of freeway in a congested area, the spacing of locations for traffic information may be short, such as ¼ mile, while in outlying areas the spacing may be large, such as every three miles.

Similarly, the amount of time over which data is collected and averaged may be varied. Ideally, the traffic information presented represents traffic conditions at that moment in time. However, it may be necessary to collect data for a length of time in order to gather enough data to either report any traffic information at all, or to insure that the traffic information is truly representative of conditions at that location. Where traffic density is high, the length of time over which data is collected and used to determine traffic conditions may be short, for example three minutes. In contrast, where traffic levels are light, data may be collected for a long period of time, such as fifteen minutes. When used to determine traffic information, the data may be averaged over the period for which data has been collected. Alternatively, the traffic information could be weighted, so that older traffic information, though used, is given less weight when determining traffic information for a particular location.

By varying the spacing between locations for which data is associated in the database and the length of time over which information is collected, the database may be configured to optimize the collection and presentation of traffic information. For areas with high traffic density, the data may be gathered over a short period of time, and the spacing between locations may be small. For areas with low traffic density, the data may be gathered over long periods of time and the spacing may be large. The database may be configured as traffic conditions change, so that during periods of congestion the information is gathered only over a short time for a particular area, while during periods of freely flowing traffic, the information is gathered over a longer time for the same area.

Figure 13:
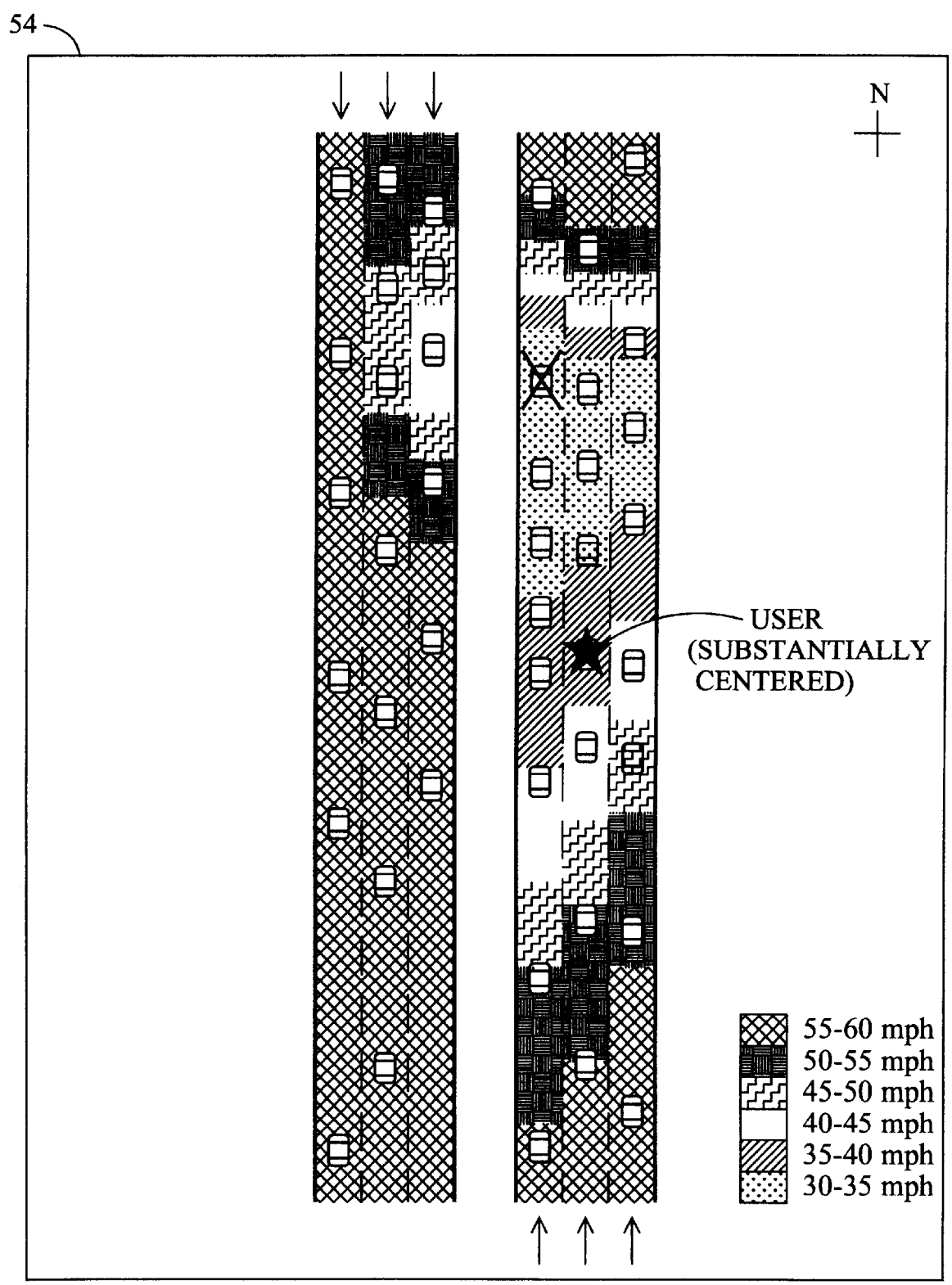
FIG. 13 is an exemplary embodiment of a centered display.

The present invention provides several alternative methods for displaying traffic information to a commuter using a mobile user station 52. These various alternatives allow the user to customize the display 54 to provide the desired information, and to minimize the amount of operation needed while driving. In one display embodiment, the display 54 centers the location of the user on the displayed map, and is referred to herein as the "Centered Display." In the Centered Display, the mobile user station 52 determines the longitude and latitude of the commuter based on information obtained from the GPS receiver 62. The mobile user station 52 then displays the position of the commuter at the center of the display 54 as shown in FIG. 13. The traffic information and roadway data is then displayed around the commuter by comparing the longitude and latitude of the user with the longitude and latitude associated with the various map locations contained in the map database. The individual user may preselect the scale of the map which will be displayed based on the user's preference. For example, the user may wish to show an area of one mile radius centered around the user, or two mile radius, or so forth. As the user drives along a road and the user's geographic location changes, the user station 52 and/or computer system 40 adjusts the display 54 to reposition the map and traffic information on the display 54. Thus, the map and traffic information scroll along the display 54 as the user moves along a road. For example, if the display 54 shows map and traffic information at a scale of one inch per mile and the direction north is shown at the top of the display, the map and traffic information would scroll down one inch as the user drives one mile north. The display 54 would continuously show the location of the user at the center of the display 54 even though the geographic location of the user changes.

A particular advantage of the Centered Display as discussed above is that the location of the user can immediately be ascertained from a quick glance at the display 54, because the location of the user is always at the center of the display 54. The user is not required to adjust the display 54 by inputting information to the user station 52 in order to constantly view the surrounding traffic information, even as the location of the user changes. Thus a commuter, by selecting the Centered Display, may view constantly updated traffic information for his location without requiring any input from the commuter.

Figure 14:
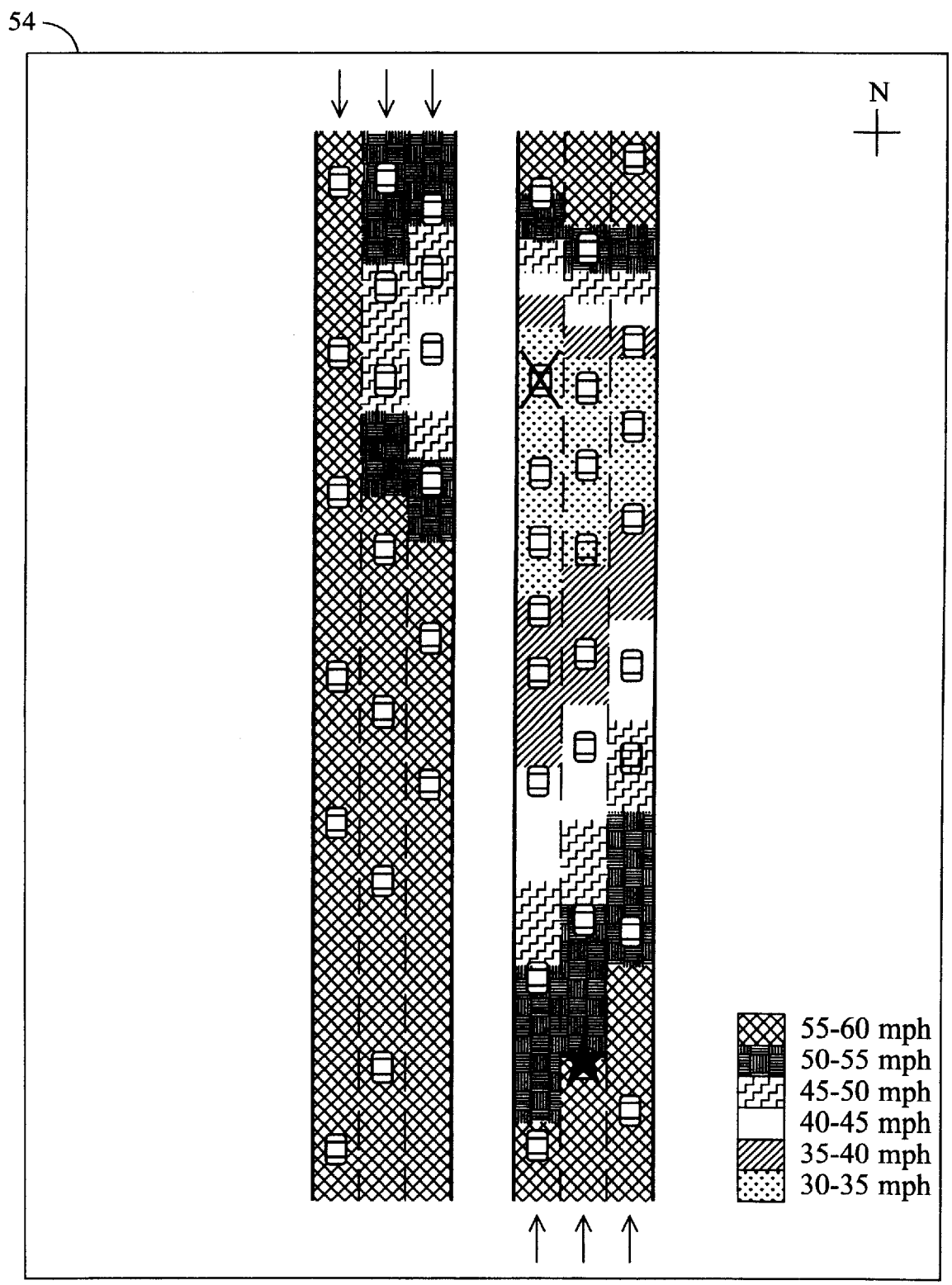
FIG. 14 is an exemplary embodiment of an offset display.

Alternatively, the display may be preselected to show the location of the user at a different location on the display 54, but that continues to show the geographic location of the user at a single location on the display 54, even as the geographic location of the user changes. This is referred to as an "Offset Display." This is a variation of the "Centered Display," but allows the user to adjust the display 54 to show more information of interest to the user. For example, if the user is traveling north, and north is shown at the top of the display 54, the user may choose to display his location near the bottom of the display (offset from the center) so as to display a greater amount of traffic information in the northern direction. Such a display is shown in FIG. 14. Like the "Centered Display," as the geographic location of the user changes, the map and traffic information is automatically scrolled to show the surrounding road and traffic, while maintaining the location of the user on the display 54. The "Offset Display" is particularly suited for driving along a relatively straight road, so that the user has relatively more upcoming traffic information displayed.

Figure 15:
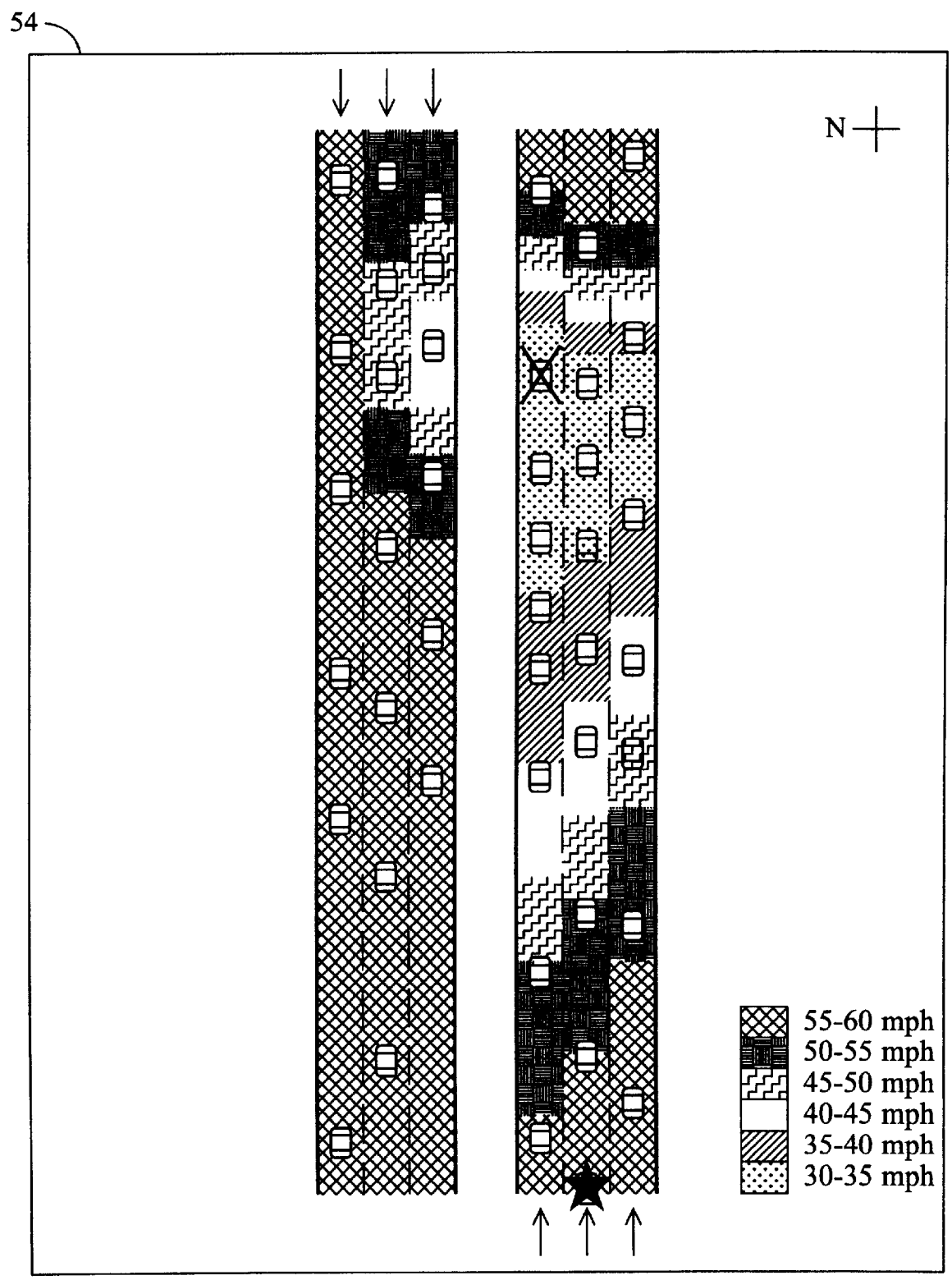
FIG. 15 is an exemplary embodiment of a look ahead display.

Yet another alternative display allows the user to display upcoming traffic information for the road on which the user is traveling, referred to herein as the "Look Ahead Display." In the Look Ahead Display, the display 54 displays the location of the user near an edge of the display 54 so as to maximize the amount of upcoming road and traffic information which is displayed. In the Look Ahead Display, the computer system 40 and/or the user station 52 determines the direction of the user based on data received from the GPS receiver 62 and compares that direction to the road the user is traveling on. The map and traffic information is then selected so as to maximize the amount of road shown ahead of the driver. The user may select to either display the map and traffic information so that the cardinal ordinates North, South, East and West remain fixed (for example North is always at the top of the display) or the road is generally centered (for example vertically on the display) without regard to the cardinal ordinates. For example, when the display maintains North at the top of the display, and the user is traveling south, the display 54 would display the location of the user near the top of the display 54, so as to increase the amount of the road ahead of the user that is displayed. If the road then curved, so that the user was heading in an easterly direction, the display 54 would show the location of the user near the left hand side of the screen so as to display the road ahead to the east (east appearing on the right hand side of the screen). This is illustrated in FIG. 15. By constantly comparing the direction of movement of the user, as determined from the data received from the GPS receiver 62, with the road information contained in the map database, the system maximizes the amount of map and traffic information displayed based on the location and direction of travel of the user.

Yet another type of display is the "Stationary Display." In this type of display, the underlying map data remains "motionless" while the displayed location of the user changes according to the movement of the user. For example, initially, the user's geographic location on the map may be shown at the center of the screen. As the user moves along a road, the user's location would change on the display 54, while the position of the road relative to the screen would remain constant. (An example of such a display is shown in FIG. 6). If the user moved to a location not displayed, a new map would be displayed, showing the location of the user on the new map screen. The Stationary Display is useful where the map database is divided into discrete units that roughly correspond to "pages." The Stationary Display can show the map data corresponding to a particular page on the display 54. New pages can be shown as the user's location changes. The Stationary Display may be preferred where the user is familiar with the surrounding area. The Stationary Display may also be less disconcerting to the user, because only a small portion of the screen is changing (the displayed location of the user) as the user's geographic location changes. The Stationary Display may also achieve some efficiencies for the system, because the computer system 40 would only be required to send enough data to fill display 54 to show the map for the area surrounding the location of the user and then update as necessary for new traffic information. Thus, the map database could be divided into discrete portions, each portion containing enough information to fill a display. In response to a request from a mobile user station 52 providing location information derived from the GPS receiver 62, the computer system 40 identifies the corresponding portion of the map database to the user station 52. The user station 52 may manage the task of integrating the map database with the user's location to display the geographic position of the user.

New map data would only be sent if the user's geographic location changed enough so that a different portion of the map database corresponds to the new location.

Yet another mode for displaying map and traffic information is to display a particular area of interest (referred to as the "Area Display"). The Area Display displays a particular geographic area of interest to the commuter. The location of the commuter may or may not be displayed, depending on whether the commuter is located within the area. To receive an Area Display, the mobile user station 52 transmits the location of the area of interest, and in response, the computer system 40 provides pertinent map and/or traffic information.

The Area Display may be especially advantageous where the commuter wishes to view a particular area of interest that may be some distance away from the commuter.

Typically the maps may be displayed with different amounts of detail, freeways, highways, parks, arterials, side streets, etc., which may be selected by the user. The amount of road detail provided for a particular region may be associated with the map provided and the technique of presentation to provide additional ease of use.

Various alternatives may be used to command the user station 52 and/or computer system 40 to display map and traffic information. In one embodiment, where the network is the Internet, the system may provide a settings preference web page to the user to allow the user to select the user's individual display settings. Thus, the user may select the scale of the display (i.e. one inch of display equals one geographic mile); the size of the display (to accommodate different screen sizes); the frequency at which the map and traffic information is updated; the particular default display type (such as the "Centered Display," "Look Ahead Display," "Stationary Display," "Area Display," or other type); and whether information banners are to be displayed. The ability to choose the frequency with which traffic information may be updated may be useful to allow the user to control the cost of providing the information to the user. For example, where the cost of being connected to the network is high, the user may wish to receive only short periodic updates (such as an update every five minutes) to reduce the expense of receiving data.

The user may also set the time duration for which the traffic information is displayed to the user. The user may choose, for example, to alternate between the traffic information web site, and another web site. Thus, the computer system 40 may transmit traffic information for 30 seconds, and then may transmit information such as stock quotes from another web site for 30 seconds.

Figure 16:
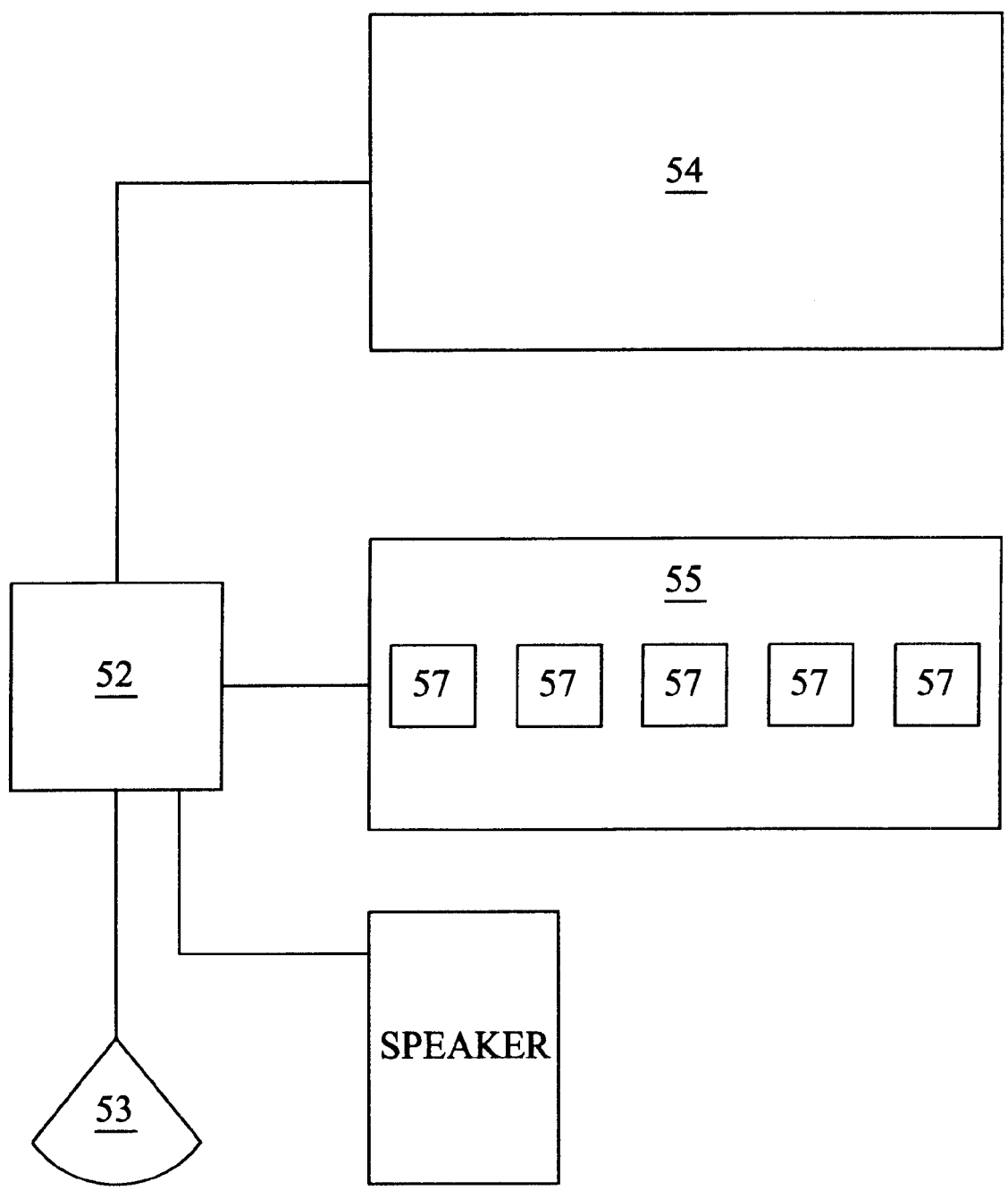
FIG. 16 is a schematic diagram of a mobile user station having alternative mechanisms for inputting commands to the user station.

In addition to default settings, or settings that are preset by the user, the user station 52 may be capable of receiving input from the user to actively change how information is displayed in response to user commands. In one embodiment, the user station 52 includes a microphone 53 and voice recognition software to allow the user station 52 to respond to the voice commands of the user. (See FIG. 16). Thus, the user may by using verbal commands select a particular mode of display, request an update of the traffic information, or change the scale of the map. Alternatively, the user station 52 may have a keyboard to accept input commands via the keyboard. Alternatively, the user station may have only a control panel 55 having several key pads 57 which correspond to particular types of preset commands.

For example, one key pad may allow a user to request traffic information. Another key pad may allow a user to zoom in on the map (i.e. change scale to show more detail), while another key pad would cause the display to zoom out (i.e. change scale to show more area). Another key pad may select for the Stationary Display, while yet another may select for the Look Ahead Display. The user station 52 may allow the user to preset the key pads 57, such as via a web page preferences page, so that the key pads correspond to the user's particular preferences. The use of key pads to select the mode in which information is displayed has several advantages. The key pads eliminate fumbling by the commuter, and thus are safer to use than a keyboard. They keypads also allow the user to quickly move between different types of modes of presentation, so that the commuter may maximize the amount of information received.

When using data from individual mobile user stations 52 to determine traffic information, it may be desirable to screen the data to determine whether it will be included in the traffic information database. One type of screening may involve comparing the geographic location of the user with particular features stored in the map database. For example, where the user is located at a stop sign, it may not be desirable to include the user's reported velocity in the database. The computer system 40 may be programmed so that data received from users at stop signs will not be added to the traffic database. Accordingly, when the user reports its geographic location, the computer system 40 compares the geographic location of the user with the map database. When the computer system 40 determines that the user is located at a stop sign (or other location, as desired), the data is rejected. Thus, the vehicle speed data transmitted by the user is screened based on the particular location of the user.

It may also be desirable to screen out data from users that are not traveling along roads of interest. For example, the computer system 40 may maintain a limited traffic information database that only stores traffic information for selected major roads. Thus, the traffic information database may contain data for fewer roads than contained in the map database. If a user is traveling along a side street which is not included in the traffic information database, the data received from the user is rejected or otherwise not used. Thus, the computer system 40 compares the geographic location of the user with the geographic locations of the roads maintained in the traffic information database. If the user reports a location that is not on a road for which traffic information is maintained in the traffic information database, the user's particular traffic information is rejected.

Another type of screening that may be desired is to compare the direction of travel of each user with the direction of travel on various roads before adding the user's vehicle speed to the traffic information database. This may be particularly important where the resolution of the GPS receiver 62 is such that the location of the user may be confused with one or more roads. For example, a user may be traveling along a divided road with lanes of traffic traveling in opposite directions, but the resolution of the GPS receiver 62 does not allow the computer system 40 to determine with confidence in which lane the user's vehicle is traveling. In order to determine what portion of the traffic information database to update, the computer system 40 and/or user station 52 creates a directional vector associated with the user which represents the user's direction of travel. The directional vector is determined based on the movement over time by the user. For example, the directional vector may be represented by a number ranging from 0–359; with 0° representing travel straight north, 90° straight east, etc. When information is received by the computer system 40, it compares the directions of travel of the various roads near the geographic location of the user with the user's directional vector. For example, the geographic information reported by the GPS receiver 62 indicates that the user is located near a particular road that has north/south lanes with traffic traveling in each direction. The user's directional vector indicates that the user is traveling south. The computer system 40 therefore updates the traffic information database to add the data received from the user to the traffic information database for the lanes of traffic moving in the user's direction of travel. Other instances in which the directional vector would be useful would be where a user is crossing a particular road, such as when traveling along an overpass or an underpass, and the resolution of the GPS receiver is such that the computer system 40 is unable to determine with confidence on which road the user is traveling. The use of the directional vector thus prevents the computer system 40 from incorrectly updating the traffic information database. In addition, the altitude component of the GPS data may be used to discriminate between users on overpasses or roads that are vertically offset from one another.

Yet another type of screening may be necessary where the user reports no movement. In this instance, it may be desirable to determine whether the user's data should be added to the database, because the user may be stopped along the side of the road while traffic is nevertheless moving. Thus, the computer system 40, when it receives data from a user indicating that the user has not moved since the last time the user reported data, may cross check the data through a variety of algorithms. For example, the computer system 40 may compare the data reported by the user with the traffic information for that portion of the road determined from data taken from sensors and/or other mobile users. If the traffic information derived from other sources indicates that traffic is moving along the road, the no movement data received from the particular user would be rejected.

Alternatively, the computer system 40 may be associated with a system that allows a user to request assistance in the event of a breakdown. The computer system 40 could check to see whether the user has reported a breakdown, and if so, reject the traffic data.

Yet another method for filtering data is to screen data received from particular users and/or classes of devices which are capable of functioning as user stations. For example, it may be desirable to exclude traffic data received from buses, because buses do not provide representative velocity data due to frequent stops. Thus all data from buses could be excluded. Alternatively, data from particular types of user stations could be excluded. For example, the computer system 40 could maintain a database of the particular types of devices used by different users. Because data from hand held devices may not correspond to a vehicle moving along a road, the computer system 40 may reject data from the class of hand held computing devices. Thus the system could distinguish between different classes of users and/or user stations 52 to determine whether to accept traffic data from that user station.

In another embodiment, the present inventors came to the realization that merely encoding the image with a representation of the traffic flow relative to a single fixed value is not optimal. An example of such coding would be red is 0–30 mph, yellow is 30–40 mph, and green is 40+ mph. This coding is adequate for freeways but when roads are encoded that have lower speed limits, the encoding should be relative to what the speed limit is so that the user knows the relative speed of traffic on the road. Thus coding may correspond to relative speed rather than absolute speed. For example, a freeway with speed limit 55 mph would be coded 0–30 mph red, 30–40 mph yellow and 40+ mph green, while a side road with a 35 mph speed limit would be coded 0–20 mph red, 20–25 mph yellow and 25+ mph green. This permits relative encoding which is easier to interpret. Alternatively, encoding may be based on other relative measures, such as for example, anticipated traffic flow for that particular road, section of road, time of day, and statistical history measure of traffic in the past. When multiple freeways in the area are all busy, such as Seattle, coding for absolute values may show everything as red. However, if relative coding is used, the traffic flow may be relative to other roads so that the encoding dynamically adjusts to encode one road relative to one or more other roads. In this manner, for example, the "fast" road may be green and the "slow" road may be red.

While the present invention has been described in the context of providing traffic information, the present invention may also be used to provide location specific information to mobile users. In one such embodiment, an information database may be created for weather reports, in which various weather reports are associated with respective geographic locations. A user in a vehicle 60 may request a weather report from the mobile user station 52. The request would include the user's geographic location as determined by the GPS receiver 62. In response to the request, the computer system would access the weather database and select the weather report associated with that geographic location. The location specific weather report would then be transmitted to the mobile user station 52. The weather report would then be displayed or otherwise communicated to the user through speakers. Other similar information databases could likewise be prepared to associate particular information with geographic locations. In this manner, a user at a mobile user station 52 may easily obtain highly relevant information that is specific to the location of the user. In preferred embodiments of the system, the user may receive both traffic information and other location specific information at the same time, in sequence, or as requested by the user. In one such embodiment, the user may preselect the information to be retrieved and the sequence of display or communication.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A system for providing traffic information to a plurality of mobile users connected to a network, comprising:
    (a) a plurality of traffic monitors, each said traffic monitor comprising at least a detector and a transmitter, said detector providing a signal including data representative of vehicular movement and said transmitter transmitting said signals;
    (b) a receiver, remotely located from said transmitter, that receives said signals transmitted by said traffic monitors; and
    (c) a computer system interconnected with said receiver and said network;
    (d) a mobile user station connected to a global positioning system receiver, a display, and a communicating device; and
    (e) said computer system, in response to a request for traffic information from one of said mobile user stations, providing in response thereto to said one of said mobile user stations traffic information representative of said signals transmitted by said traffic monitors;
    (f) wherein said traffic information transmitted by said computer system is displayed graphically on said display; and
    (g) wherein said computer system has a map database, and said computer system, in response to said request for information, transmits map information representative of a portion of said map database, and said map information representative of said map database is displayed graphically together with said traffic information.

2. The system of claim 1 wherein said traffic information is displayed together with a video image.

3. The system of claim 1 wherein said traffic information is displayed with a text message.

4. The system of claim 1 wherein said traffic detector detects vehicular speed.

5. The system of claim 1 wherein at least one of said transmitters transmits directly to said receiver.

6. The system of claim 1 wherein at least one of said transmitters transmits to another traffic monitor.

7. The system of claim 1 wherein at least one of said traffic monitors includes a video camera.

8. The system of claim 7 wherein said detector is a video camera.

9. The system of claim 1 wherein said user provides latitude and longitude information to said computer system.

10. The system of claim 1 wherein said computer system selects said traffic information to provide to said mobile user station based on a signal received from said global positioning system receiver.

11. The system of claim 10 wherein said computer system maintains a traffic information database containing data representative of traffic at a plurality of locations and updates said traffic information database in response to signals received from said mobile user station.

12. The system of claim 11 wherein said mobile user station displays both the location of said mobile user station and traffic information graphically on said display.

13. The system of claim 12 wherein said mobile user station has an input mechanism to select a mode in which traffic information is shown on said display.

14. A system for providing traffic information to a plurality of mobile users connected to a network, comprising:
   (a) a plurality of vehicles, each said vehicle comprising at least a mobile user station, a global positioning system receiver and a transmitter, said mobile user station providing a signal including data representative of a location of said mobile user station and at least one of a speed of said vehicle and an identification code of said mobile user station and said transmitter transmitting said signal;
   (b) a receiver that receives said signals transmitted by said user stations; and
   (c) a computer system interconnected with said receiver and said network, said computer system, in response to a request for information from one of said mobile user stations, providing in response thereto to said one of said mobile user stations information representative of said signals transmitted by said mobile user stations;
   (d) wherein said vehicle further comprises a display and said information transmitted by said computer system is displayed graphically on said display; and
   (e) wherein said computer system has a map database, and said computer system, in response to said request for information, transmits information representative of a portion of said map database, and said information representative of said map database is displayed graphically.

15. The system of claim 14 wherein said computer system maintains a traffic information database containing information representative of traffic at a plurality of locations and updates said traffic information database in response to signals received from stationary traffic monitors.

16. The system of claim 15 wherein said computer system screens data provided by said mobile user stations to determine before updating said traffic information database.

17. The system of claim 14 wherein the location of said one of said mobile user stations is displayed graphically on said display together with said traffic information provided by said computer system.

18. The system of claim 17 wherein said location of said vehicle is shown at a point on said display regardless of movement of said vehicle.

19. The system of claim 17 wherein said displayed location of said vehicle depends on said location of said vehicle, so that the displayed location changes as the vehicle's location changes.

20. The system of claim 14 wherein said mobile user station has an input mechanism to select different modes of displaying traffic information on said display.

21. A system for providing traffic information to a plurality of mobile users connected to a network, comprising:
   (a) a plurality of mobile user stations, each mobile user station being associated with a display, a global positioning system receiver and a communicating device to allow each of said mobile user stations to send and receive signals;
   (b) a computer system interconnected with another communicating device and a network, said computer system being capable of sending and receiving signals to and from said mobile user stations;
   (c) said computer system including a map database and a traffic information database, said traffic information database containing data representative of traffic at a plurality of locations;
   (d) at least one of said mobile user stations providing a request to said computer system for information together with a respective geographic location of said one of said mobile user stations, and in response thereto, said computer system providing to said one of said mobile user stations information representative of selected portions of said map database and selected portions of said traffic information database based on said respective geographic location of said one of said mobile user stations; and
   (e) said one of said mobile user stations displaying graphically on said display information representative of said selected portions of said map database and said selected portions of said traffic information database.

22. The system of claim 21 wherein said computer system is connected to a plurality of traffic monitors, and said traffic information database contains data derived from said traffic monitors.

23. The system of claim 22 wherein said computer system updates said traffic information database based on data received from said mobile user stations.

24. The system of claim 23 wherein said computer system compares data from said mobile user stations with said data derived from said traffic monitors before updating said traffic information database.

25. The system of claim 21 wherein said computer system updates said traffic information database based on data received from said mobile user stations.

26. The system of claim 21 wherein said map database contains longitude and latitude information for locations within said database.

27. The system of claim 26 wherein said traffic information database and map database are integrated using said longitude and latitude information.

28. The system of claim 27 wherein each said mobile user station provides longitude and latitude information to said computer system.

29. The system of claim 21 wherein said computer system transmits information which is displayed as an information banner on said display.

30. The system of claim 21 wherein said mobile user stations each have an input mechanism for selecting the mode of displaying information on said display.

31. The system of claim 21 wherein said location of said one of said mobile user stations is displayed graphically.

32. The system of claim 31 wherein said displayed location of said one of said mobile user stations changes based on movement of said mobile user station.

33. The system of claim 21 wherein said computer system screens data provided by said mobile user stations to determine whether said data corresponds to actual traffic conditions.

34. The system of claim 21 wherein said computer system compares data provided from said one of said mobile user stations with said map database before updating said traffic information database.

* * * * *

(12) EX PARTE REEXAMINATION CERTIFICATE (8310th)
United States Patent
DeKock et al.

(10) Number: US 6,466,862 C1
(45) Certificate Issued: Jun. 7, 2011

(54) SYSTEM FOR PROVIDING TRAFFIC INFORMATION

(75) Inventors: Bruce W. DeKock, Portland, OR (US); Kevin L. Russell, Portland, OR (US); Richard J. Qian, Camas, WA (US)

(73) Assignee: Traffic Information, LLC, Ilwaco, WA (US)

Reexamination Request:
No. 90/010,645, Sep. 25, 2009

Reexamination Certificate for:
Patent No.: 6,466,862
Issued: Oct. 15, 2002
Appl. No.: 09/550,476
Filed: Apr. 14, 2000

Related U.S. Application Data

(60) Provisional application No. 60/130,399, filed on Apr. 19, 1999, provisional application No. 60/166,868, filed on Nov. 22, 1999, and provisional application No. 60/189,913, filed on Mar. 16, 2000.

(51) Int. Cl.
*G08G 1/09* (2006.01)

(52) U.S. Cl. .................. 701/117; 340/901; 340/905; 340/988; 342/357.43; 701/118; 701/119

(58) Field of Classification Search .................. None
See application file for complete search history.

(56) References Cited

U.S. PATENT DOCUMENTS

| 1,266,367 A | 5/1918 | Wilson |
| 1,638,716 A | 8/1927 | Surles |
| 1,995,656 A | 3/1935 | Stout |
| 2,371,451 A | 3/1945 | Larson |
| 2,528,201 A | 10/1950 | White |
| 2,665,381 A | 1/1954 | Smith et al. |
| 2,672,945 A | 3/1954 | Harris et al. |
| 2,720,372 A | 10/1955 | Gowan |
| 2,877,427 A | 3/1959 | Butler |
| 2,966,580 A | 12/1960 | Taylor |
| 2,980,887 A | 4/1961 | Soderberg |
| 3,030,497 A | 4/1962 | Cheng |
| 3,056,106 A | 9/1962 | Hendricks |
| 3,056,121 A | 9/1962 | Jackson |
| 3,063,048 A | 11/1962 | Lehan et al. |

(Continued)

FOREIGN PATENT DOCUMENTS

| EP | 0 061 674 | 10/1982 |
| EP | 0 123 562 | 10/1984 |
| EP | 0 242 099 | 10/1987 |
| FR | 2 541 801 | 8/1984 |
| JP | 57-159310 | 10/1982 |

(Continued)

OTHER PUBLICATIONS

Blumentritt, C., Balke, K., Seymour, E., Sanchez, R., TravTek System Architecture Evaluation, Jul. 1995, Federal Highway Administration, McLean, Virginia.

Imnan, V. W., Peters, J. I., TravTek Global Evaluation and Executive Summary, Mar. 1996, Federal Highway Administration, McLean, Virginia.

(Continued)

*Primary Examiner*—Matthew Heneghan

(57) ABSTRACT

A system for providing traffic information to a plurality of mobile users connected to a network. The system comprises a plurality of traffic monitors, each comprising at least a traffic detector and a transmitter, the traffic detector generating a signal in response to vehicular traffic and the transmitter transmitting the signal. A receiver receives the signals from the traffic monitors. A computer system is connected to the receiver and is further connected to the network. The computer system in response to a request signal received from one of the users transmits in response thereto information representative of the signals transmitted by the traffic monitoring units. Alternative systems for gathering traffic information are disclosed.

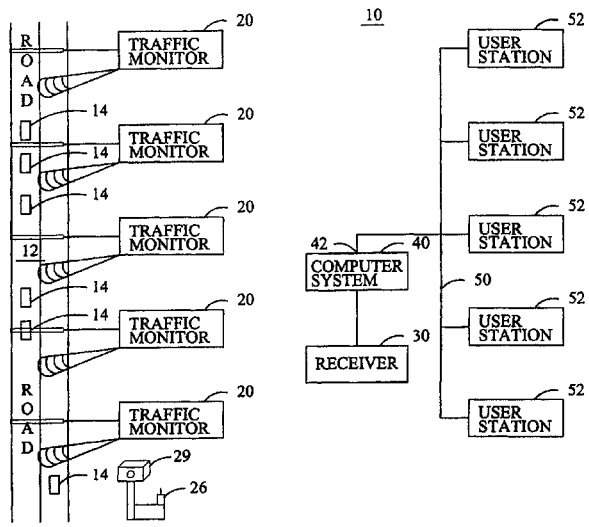

U.S. PATENT DOCUMENTS

| | | |
|---|---|---|
| 3,126,191 A | 3/1964 | Holden |
| 3,130,970 A | 4/1964 | Hutsell |
| 3,199,074 A | 8/1965 | Hales et al. |
| 3,237,154 A | 2/1966 | Barker |
| 3,275,984 A | 9/1966 | Barker |
| 3,312,436 A | 4/1967 | Beghetto, Jr. |
| 3,322,940 A | 5/1967 | Barker et al. |
| 3,324,396 A | 6/1967 | Schneider |
| 3,345,503 A | 10/1967 | Auer, Jr. |
| 3,374,359 A | 3/1968 | Anderson |
| D216,984 S | 3/1970 | Stanford et al. |
| 3,506,808 A | 4/1970 | Riddle, Jr. et al. |
| 3,516,056 A | 6/1970 | Matthews |
| 3,558,994 A | 1/1971 | Bernstein |
| 3,563,221 A | 2/1971 | Tada |
| 3,563,335 A | 2/1971 | Holmes |
| 3,583,149 A | 6/1971 | Ganter |
| 3,626,413 A | 12/1971 | Zachmann |
| 3,644,818 A | 2/1972 | Paget |
| 3,681,697 A | 8/1972 | Moroney |
| 3,710,081 A | 1/1973 | Apitz |
| 3,711,686 A | 1/1973 | Apitz |
| 3,753,219 A | 8/1973 | King, Jr. |
| 3,774,147 A | 11/1973 | Hendricks |
| 3,798,651 A | 3/1974 | Lehman |
| 3,802,653 A | 4/1974 | Nyulassie |
| 3,872,422 A | 3/1975 | Obermaier et al. |
| 3,885,227 A | 5/1975 | Moissl |
| 3,893,061 A | 7/1975 | Slawsky et al. |
| 3,899,671 A | 8/1975 | Stover |
| 3,906,438 A | 9/1975 | Kohnert |
| 3,916,329 A | 10/1975 | Hekimian et al. |
| 3,916,374 A | 10/1975 | Drebinger et al. |
| 3,919,686 A | 11/1975 | Narbaits-Jaureguy et al. |
| 3,978,330 A | 8/1976 | Maurer |
| 4,012,744 A | 3/1977 | Greiser |
| 4,013,969 A | 3/1977 | Dennison |
| 4,014,503 A | 3/1977 | Raimer |
| 4,021,807 A | 5/1977 | Culpepper et al. |
| 4,023,017 A | 5/1977 | Ceseri |
| 4,050,798 A | 9/1977 | Boggs |
| 4,081,783 A | 3/1978 | Honda |
| 4,086,632 A | 4/1978 | Lions |
| 4,087,066 A | 5/1978 | Bahker et al. |
| 4,087,067 A | 5/1978 | Bahker et al. |
| 4,120,037 A | 10/1978 | Sato |
| 4,138,711 A | 2/1979 | Bremenour et al. |
| 4,143,328 A | 3/1979 | Kurita et al. |
| 4,162,696 A | 7/1979 | Sprung |
| 4,163,216 A | 7/1979 | Arpino |
| 4,203,070 A | 5/1980 | Bowles et al. |
| 4,212,067 A | 7/1980 | Henderson et al. |
| 4,232,395 A | 11/1980 | Yokogawa |
| 4,237,540 A | 12/1980 | Sato |
| 4,242,639 A | 12/1980 | Boone |
| 4,247,939 A | 1/1981 | Stromswold et al. |
| 4,249,418 A | 2/1981 | Ebata |
| 4,268,894 A | 5/1981 | Bartunek et al. |
| 4,270,721 A | 6/1981 | Mainor, Jr. |
| 4,289,383 A | 9/1981 | Schwarzschild |
| 4,290,136 A | 9/1981 | Brunner et al. |
| 4,296,400 A | 10/1981 | Friedbert et al. |
| 4,297,004 A | 10/1981 | Nishimura et al. |
| 4,297,707 A | 10/1981 | Brunner et al. |
| 4,303,905 A | 12/1981 | Drebinger |
| 4,323,970 A | 4/1982 | Brunner et al. |
| 4,344,122 A | 8/1982 | Jones |
| 4,350,970 A | 9/1982 | Von Tomkewitsch |
| 4,352,086 A | 9/1982 | Hunziker |
| 4,357,593 A | 11/1982 | Von Tomkewitsch |
| 4,362,353 A | 12/1982 | Cobaugh et al. |
| 4,369,427 A | 1/1983 | Drebinger et al. |
| 4,380,745 A | 4/1983 | Barlow et al. |
| 4,380,821 A | 4/1983 | Eckhardt |
| 4,398,171 A | 8/1983 | Dahan et al. |
| 4,409,583 A | 10/1983 | Dahan et al. |
| 4,445,118 A | 4/1984 | Taylor et al. |
| 4,451,830 A | 5/1984 | Lucas et al. |
| 4,459,667 A | 7/1984 | Takeuchi |
| 4,466,701 A | 8/1984 | Ogata et al. |
| 4,485,477 A | 11/1984 | Nossen |
| 4,486,857 A | 12/1984 | Heckel |
| 4,527,030 A | 7/1985 | Oelsch |
| 4,530,103 A | 7/1985 | Mosley, Jr. et al. |
| 4,531,176 A | 7/1985 | Beecher, II |
| 4,531,236 A | 7/1985 | Ishihara |
| 4,540,865 A | 9/1985 | Calder |
| 4,549,286 A | 10/1985 | Langeraar et al. |
| 4,555,938 A | 12/1985 | Boucher et al. |
| 4,561,115 A | 12/1985 | Pfeifer |
| 4,562,382 A | 12/1985 | Elliott |
| 4,580,289 A | 4/1986 | Enderby |
| 4,592,526 A | 6/1986 | Kobelt |
| 4,593,273 A | 6/1986 | Narcisse |
| 4,612,543 A | 9/1986 | De Vries |
| 4,613,913 A | 9/1986 | Phillips |
| 4,627,100 A | 12/1986 | Tekano |
| 4,630,209 A | 12/1986 | Saito et al. |
| 4,633,194 A | 12/1986 | Kikuchi et al. |
| 4,633,517 A | 12/1986 | Pfeifer |
| 4,642,606 A | 2/1987 | Tsuyama |
| 4,644,787 A | 2/1987 | Boucher et al. |
| 4,646,015 A | 2/1987 | Phillips |
| 4,647,126 A | 3/1987 | Sobota, Jr. |
| 4,651,157 A | 3/1987 | Gray et al. |
| 4,659,881 A | 4/1987 | Dowe |
| 4,668,843 A | 5/1987 | Watanabe |
| 4,675,656 A | 6/1987 | Narcisse |
| 4,675,691 A | 6/1987 | Moore |
| 4,677,395 A | 6/1987 | Baker |
| 4,677,450 A | 6/1987 | Ito et al. |
| 4,677,563 A | 6/1987 | Itoh et al. |
| D291,288 S | 8/1987 | Suzuki |
| 4,686,642 A | 8/1987 | Buxton et al. |
| 4,687,167 A | 8/1987 | Skalka et al. |
| 4,700,332 A | 10/1987 | Hwang |
| 4,713,661 A | 12/1987 | Boone et al. |
| 4,716,522 A | 12/1987 | Funabashi et al. |
| 4,729,907 A | 3/1988 | Deal et al. |
| 4,733,356 A | 3/1988 | Haeussermann et al. |
| 4,734,863 A | 3/1988 | Honey et al. |
| 4,738,625 A | 4/1988 | Burton et al. |
| 4,748,681 A | 5/1988 | Schmidt |
| 4,750,197 A | 6/1988 | Denekamp et al. |
| 4,754,465 A | 6/1988 | Trimble |
| 4,760,531 A | 7/1988 | Yasui et al. |
| 4,763,130 A | 8/1988 | Weinstein |
| 4,774,671 A | 9/1988 | Itoh et al. |
| 4,774,672 A | 9/1988 | Tsunoda et al. |
| 4,777,630 A | 10/1988 | Burns |
| 4,780,604 A | 10/1988 | Hasegawa et al. |
| 4,780,717 A | 10/1988 | Takanabe et al. |
| 4,780,791 A | 10/1988 | Morita et al. |
| 4,780,793 A | 10/1988 | Ohtsuki |
| 4,788,645 A | 11/1988 | Zavoli et al. |
| 4,792,803 A | 12/1988 | Madnick et al. |
| 4,792,907 A | 12/1988 | Ikeda et al. |
| 4,796,189 A | 1/1989 | Nakayama et al. |
| 4,796,191 A | 1/1989 | Honey et al. |
| 4,797,916 A | 1/1989 | Kojima |
| 4,809,005 A | 2/1989 | Counselman, III |

| | | | | | |
|---|---|---|---|---|---|
| 4,811,491 A | 3/1989 | Phillips et al. | 5,108,334 A | 4/1992 | Eschenback et al. |
| 4,811,507 A | 3/1989 | Blanchet | 5,109,364 A | 4/1992 | Stiner |
| 4,811,613 A | 3/1989 | Phillips et al. | 5,109,500 A | 4/1992 | Iseki et al. |
| 4,812,843 A | 3/1989 | Champion, III et al. | D325,837 S | 5/1992 | Schwartz |
| 4,812,980 A | 3/1989 | Yamada et al. | D326,450 S | 5/1992 | Watanabe |
| 4,819,174 A | 4/1989 | Furuno et al. | 5,111,150 A | 5/1992 | Casey |
| 4,819,175 A | 4/1989 | Wuttke | 5,115,398 A | 5/1992 | DeJong |
| 4,829,492 A | 5/1989 | Choi et al. | 5,119,101 A | 6/1992 | Barnard |
| 4,831,538 A | 5/1989 | Cucchiari et al. | 5,119,504 A | 6/1992 | Durboraw, III |
| 4,831,563 A | 5/1989 | Ando et al. | 5,123,621 A | 6/1992 | Gates |
| 4,834,329 A | 5/1989 | Delapp | 5,126,941 A | 6/1992 | Gurmu et al. |
| D301,882 S | 6/1989 | Watanabe | 5,133,076 A | 7/1992 | Hawkins et al. |
| 4,843,399 A | 6/1989 | Bongiorno et al. | 5,134,390 A | 7/1992 | Kishimoto et al. |
| 4,843,403 A | 6/1989 | Lalezari et al. | 5,139,223 A | 8/1992 | Sedighzabeh |
| 4,843,544 A | 6/1989 | DuLac et al. | 5,142,497 A | 8/1992 | Warrow |
| D302,160 S | 7/1989 | Egashira | 5,144,323 A | 9/1992 | Yonkers |
| D302,271 S | 7/1989 | Watanabe | 5,146,231 A | 9/1992 | Ghaem et al. |
| 4,862,395 A | 8/1989 | Fey et al. | 5,148,002 A | 9/1992 | Kuo et al. |
| 4,868,715 A | 9/1989 | Putman et al. | 5,151,774 A | 9/1992 | Mori et al. |
| 4,872,091 A | 10/1989 | Maniwa et al. | D329,988 S | 10/1992 | Burrell et al. |
| 4,889,302 A | 12/1989 | Tucker | 5,153,583 A | 10/1992 | Murdoch |
| 4,896,337 A | 1/1990 | Bushy, Jr. | 5,153,818 A | 10/1992 | Mukougawa et al. |
| 4,899,285 A | 2/1990 | Nakayama et al. | 5,154,390 A | 10/1992 | Bain et al. |
| 4,903,325 A | 2/1990 | Yoshitake et al. | 5,161,169 A | 11/1992 | Galano et al. |
| 4,905,124 A | 2/1990 | Banjo et al. | 5,161,886 A | 11/1992 | DeJong et al. |
| 4,907,208 A | 3/1990 | Lowrance et al. | 5,164,904 A | 11/1992 | Summer |
| 4,907,290 A | 3/1990 | Crompton | 5,172,075 A | 12/1992 | Yerbury et al. |
| 4,912,756 A | 3/1990 | Hop | 5,172,110 A | 12/1992 | Tiefengraber |
| 4,914,605 A | 4/1990 | Loughmiller, Jr. | 5,173,691 A | 12/1992 | Sumner |
| 4,921,467 A | 5/1990 | Lax | 5,173,840 A | 12/1992 | Kodai et al. |
| 4,924,402 A | 5/1990 | Ando et al. | 5,173,849 A | 12/1992 | Brooks |
| 4,939,661 A | 7/1990 | Barker et al. | 5,177,685 A | 1/1993 | Davis et al. |
| 4,939,663 A | 7/1990 | Baird | 5,182,555 A | 1/1993 | Sumner |
| 4,943,951 A | 7/1990 | Leavell et al. | 5,184,330 A | 2/1993 | Adams et al. |
| 4,953,198 A | 8/1990 | Daly et al. | 5,184,830 A | 2/1993 | Okada et al. |
| 4,955,817 A | 9/1990 | Sugai | 5,185,610 A | 2/1993 | Ward et al. |
| 4,956,750 A | 9/1990 | Maggelet | 5,189,404 A | 2/1993 | Masimo et al. |
| 4,956,756 A | 9/1990 | Hsiao | 5,189,539 A | 2/1993 | Suzuki |
| 4,969,647 A | 11/1990 | Mical et al. | 5,191,792 A | 3/1993 | Gloor |
| 4,970,523 A | 11/1990 | Braisted et al. | 5,193,215 A | 3/1993 | Olmers |
| 4,974,120 A | 11/1990 | Kodai et al. | 5,196,743 A | 3/1993 | Brooks |
| D312,650 S | 12/1990 | Charrier | 5,200,757 A | 4/1993 | Jairam |
| 4,977,509 A | 12/1990 | Pitchford et al. | 5,200,902 A | 4/1993 | Pilley |
| 4,982,314 A | 1/1991 | Miki | 5,203,030 A | 4/1993 | Kawasaki |
| 4,982,332 A | 1/1991 | Saito et al. | 5,204,817 A | 4/1993 | Yoshida |
| 4,985,705 A | 1/1991 | Stammler | 5,206,641 A | 4/1993 | Grant et al. |
| D314,713 S | 2/1991 | Ciranny et al. | 5,208,756 A | 5/1993 | Song |
| 4,989,813 A | 2/1991 | Kim et al. | 5,210,540 A | 5/1993 | Masumoto |
| 5,003,306 A | 3/1991 | Takahashi et al. | 5,212,643 A | 5/1993 | Yoshida |
| 5,005,108 A | 4/1991 | Pristash et al. | 5,216,430 A | 6/1993 | Rahm et al. |
| 5,008,647 A | 4/1991 | Brunt et al. | 5,220,509 A | 6/1993 | Takemura et al. |
| 5,017,767 A | 5/1991 | Mizuno | 5,223,844 A | 6/1993 | Mansell et al. |
| 5,020,143 A | 5/1991 | Duckeck et al. | D337,582 S | 7/1993 | Lewo |
| 5,021,794 A | 6/1991 | Lawrence | 5,225,842 A | 7/1993 | Brown et al. |
| 5,031,076 A | 7/1991 | Kiku | 5,226,622 A | 7/1993 | Lee Anna |
| 5,043,736 A | 8/1991 | Darnell et al. | 5,229,925 A | 7/1993 | Spencer et al. |
| 5,045,770 A | 9/1991 | Brooks | 5,230,016 A | 7/1993 | Yasuda |
| 5,053,613 A | 10/1991 | Onoda | 5,233,844 A | 8/1993 | Knippscheer et al. |
| 5,053,928 A | 10/1991 | Pasco | 5,235,315 A | 8/1993 | Cherry et al. |
| 5,058,996 A | 10/1991 | Washizuka et al. | 5,235,633 A | 8/1993 | Dennison et al. |
| 5,067,081 A | 11/1991 | Person | 5,237,449 A | 8/1993 | Nelson et al. |
| 5,068,670 A | 11/1991 | Maoz | 5,239,697 A | 8/1993 | Kosuga |
| 5,068,765 A | 11/1991 | Nimpoeno | 5,243,528 A | 9/1993 | Lefevre |
| D323,249 S | 1/1992 | Schwartz | 5,243,529 A | 9/1993 | Kashiwazaki |
| 5,081,431 A | 1/1992 | Kubo et al. | 5,245,314 A | 9/1993 | Kah, Jr. |
| 5,087,919 A | 2/1992 | Odagawa et al. | 5,246,790 A | 9/1993 | Mooney et al. |
| 5,087,969 A | 2/1992 | Kamada et al. | 5,247,356 A | 9/1993 | Ciampa |
| 5,092,552 A | 3/1992 | Dayton et al. | 5,247,439 A | 9/1993 | Gurmu et al. |
| 5,099,455 A | 3/1992 | Parra | 5,248,989 A | 9/1993 | Murdoch |
| 5,103,377 A | 4/1992 | Kobayashi et al. | 5,255,005 A | 10/1993 | Terret et al. |
| 5,107,227 A | 4/1992 | Brooks | 5,258,766 A | 11/1993 | Murdoch |

| Patent No. | Date | Name |
|---|---|---|
| 5,260,912 A | 11/1993 | Latham |
| 5,263,423 A | 11/1993 | Anderson |
| 5,266,958 A | 11/1993 | Durboraw, III |
| 5,267,181 A | 11/1993 | George |
| 5,272,327 A | 12/1993 | Mitchell et al. |
| 5,272,638 A | 12/1993 | Martin et al. |
| D343,081 S | 1/1994 | Schwartz |
| 5,283,589 A | 2/1994 | Blevins |
| 5,288,237 A | 2/1994 | Mizutani et al. |
| 5,289,183 A | 2/1994 | Hassett et al. |
| 5,289,195 A | 2/1994 | Inoue |
| 5,293,163 A | 3/1994 | Kakihara et al. |
| 5,297,049 A | 3/1994 | Gurmu et al. |
| 5,297,051 A | 3/1994 | Arakawa et al. |
| 5,301,368 A | 4/1994 | Hirata |
| 5,302,954 A | 4/1994 | Brooks et al. |
| 5,307,277 A | 4/1994 | Hirano |
| 5,307,515 A | 4/1994 | Kuu et al. |
| 5,311,195 A | 5/1994 | Mathis et al. |
| 5,311,339 A | 5/1994 | Fertig et al. |
| 5,313,200 A | 5/1994 | Sone |
| 5,317,311 A | 5/1994 | Martell et al. |
| 5,319,516 A | 6/1994 | Perkins |
| 5,323,164 A | 6/1994 | Endo |
| D348,886 S | 7/1994 | Watanabe |
| 5,326,059 A | 7/1994 | Pryor et al. |
| 5,327,398 A | 7/1994 | Wansley et al. |
| 5,329,546 A | 7/1994 | Lee |
| 5,330,360 A | 7/1994 | Marsh et al. |
| 5,331,563 A | 7/1994 | Masumoto et al. |
| 5,332,185 A | 7/1994 | Walker, III |
| 5,333,116 A | 7/1994 | Hawkins et al. |
| D350,137 S | 8/1994 | Watanabe |
| 5,335,145 A | 8/1994 | Kusui |
| 5,335,188 A | 8/1994 | Brisson |
| 5,337,985 A | 8/1994 | Hale |
| 5,339,222 A | 8/1994 | Simmons et al. |
| 5,343,399 A | 8/1994 | Yokoyama et al. |
| 5,345,244 A | 9/1994 | Gildea et al. |
| 5,349,530 A | 9/1994 | Odagawa |
| 5,350,147 A | 9/1994 | Paganus |
| 5,353,040 A | 10/1994 | Yamada et al. |
| 5,355,511 A | 10/1994 | Hatano et al. |
| 5,357,402 A | 10/1994 | Anhalt |
| 5,358,135 A | 10/1994 | Robbins et al. |
| 5,361,212 A | 11/1994 | Class et al. |
| 5,363,306 A | 11/1994 | Kuwahara et al. |
| 5,364,093 A | 11/1994 | Huston et al. |
| 5,365,448 A | 11/1994 | Nobe et al. |
| 5,365,450 A | 11/1994 | Schuchman et al. |
| 5,371,754 A | 12/1994 | Berndt et al. |
| 5,373,531 A | 12/1994 | Kawasaki |
| 5,375,037 A | 12/1994 | Le Roux |
| D354,451 S | 1/1995 | Burrell et al. |
| D354,452 S | 1/1995 | Burrell et al. |
| 5,379,224 A | 1/1995 | Brown et al. |
| 5,379,658 A | 1/1995 | Lichtenfels, II et al. |
| 5,386,084 A | 1/1995 | Risko |
| 5,386,340 A | 1/1995 | Kurz |
| 5,389,934 A | 2/1995 | Kass |
| 5,392,005 A | 2/1995 | Bortolini et al. |
| 5,396,429 A | 3/1995 | Hanchett |
| 5,396,430 A | 3/1995 | Arakawa et al. |
| 5,396,431 A | 3/1995 | Shimizu et al. |
| 5,397,857 A | 3/1995 | Farquhar et al. |
| 5,402,117 A | 3/1995 | Zijderhand |
| 5,402,347 A | 3/1995 | McBurney et al. |
| 5,406,490 A | 4/1995 | Braegas |
| 5,406,491 A | 4/1995 | Lima |
| 5,408,238 A | 4/1995 | Smith |
| 5,408,385 A | 4/1995 | Fowler et al. |
| 5,410,486 A | 4/1995 | Kishi et al. |
| 5,414,253 A | 5/1995 | Baudouin et al. |
| 5,414,432 A | 5/1995 | Penny et al. |
| 5,416,666 A | 5/1995 | Maguire, Jr. |
| 5,416,712 A | 5/1995 | Geier et al. |
| 5,420,592 A | 5/1995 | Johnson |
| 5,420,779 A | 5/1995 | Payne |
| 5,424,953 A | 6/1995 | Masumoto et al. |
| 5,426,780 A | 6/1995 | Gerull et al. |
| 5,427,032 A | 6/1995 | Hiltz et al. |
| 5,428,545 A | 6/1995 | Maegawa et al. |
| 5,429,336 A | 7/1995 | Ko |
| 5,434,789 A | 7/1995 | Fraker et al. |
| D360,839 S | 8/1995 | Kim |
| D361,288 S | 8/1995 | Chandwick et al. |
| 5,438,518 A | 8/1995 | Bianco et al. |
| 5,440,448 A | 8/1995 | Stewart et al. |
| 5,440,451 A | 8/1995 | Saito et al. |
| 5,446,622 A | 8/1995 | Landry et al. |
| 5,452,212 A | 9/1995 | Yokoyama et al. |
| 5,452,217 A | 9/1995 | Kishi et al. |
| 5,452,874 A | 9/1995 | Kozloff et al. |
| D363,488 S | 10/1995 | Shumaker |
| 5,456,442 A | 10/1995 | Sutton et al. |
| 5,459,479 A | 10/1995 | Cummings |
| 5,461,365 A | 10/1995 | Schlager et al. |
| 5,463,554 A | 10/1995 | Araki et al. |
| 5,469,175 A | 11/1995 | Boman |
| 5,471,205 A | 11/1995 | Izawa |
| D365,032 S | 12/1995 | Laverick et al. |
| D365,292 S | 12/1995 | Laverick et al. |
| 5,475,599 A | 12/1995 | Yokoyama et al. |
| 5,476,241 A | 12/1995 | Helman |
| 5,477,458 A | 12/1995 | Loomis |
| 5,485,154 A | 1/1996 | Brooks et al. |
| 5,493,309 A | 2/1996 | Bjornholt |
| 5,497,148 A | 3/1996 | Oliva |
| 5,502,452 A | 3/1996 | Gomez |
| 5,502,640 A | 3/1996 | Yagyu et al. |
| 5,503,361 A | 4/1996 | Kan-O et al. |
| 5,504,683 A | 4/1996 | Gurmu et al. |
| 5,506,578 A | 4/1996 | Kishi et al. |
| 5,506,587 A | 4/1996 | Lans |
| 5,506,774 A | 4/1996 | Nobe et al. |
| 5,508,931 A | 4/1996 | Snider |
| 5,512,912 A | 4/1996 | Ross et al. |
| 5,517,253 A | 5/1996 | DeLange |
| 5,523,761 A | 6/1996 | Gildea |
| 5,523,950 A | 6/1996 | Peterson |
| 5,526,235 A | 6/1996 | Beason et al. |
| 5,528,248 A | 6/1996 | Steiner et al. |
| 5,537,323 A | 7/1996 | Schulte |
| 5,539,398 A | 7/1996 | Hall et al. |
| 5,539,645 A | 7/1996 | Mandhyan et al. |
| 5,543,802 A | 8/1996 | Villevieille et al. |
| 5,546,107 A | 8/1996 | Deretsky et al. |
| 5,548,822 A | 8/1996 | Yogo |
| 5,552,794 A | 9/1996 | Colley et al. |
| 5,553,261 A | 9/1996 | Hasbun et al. |
| 5,555,286 A | 9/1996 | Tendler |
| 5,559,511 A | 9/1996 | Ito et al. |
| 5,559,707 A | 9/1996 | DeLorme et al. |
| 5,564,083 A | 10/1996 | Lee et al. |
| 5,564,560 A | 10/1996 | Minelli et al. |
| 5,568,390 A | 10/1996 | Hirota et al. |
| 5,570,095 A | 10/1996 | Drouilhet et al. |
| 5,572,217 A | 11/1996 | Flawn |
| 5,575,549 A | 11/1996 | Ishikawa et al. |
| 5,581,259 A | 12/1996 | Schipper |
| 5,581,790 A | 12/1996 | Sefidvash |
| 5,584,556 A | 12/1996 | Yokoyama et al. |

| Patent | Date | Inventor |
|---|---|---|
| 5,586,264 A | 12/1996 | Belknap et al. |
| 5,592,367 A | 1/1997 | Sugimori et al. |
| 5,592,401 A | 1/1997 | Kramer |
| 5,594,432 A | 1/1997 | Oliva et al. |
| 5,606,732 A | 2/1997 | Vicnone, Sr. |
| 5,606,736 A | 2/1997 | Hasler et al. |
| 5,610,821 A | 3/1997 | Gazis et al. |
| 5,610,971 A | 3/1997 | Vandivier |
| 5,612,804 A | 3/1997 | Hara |
| 5,613,055 A | 3/1997 | Shimoura et al. |
| 5,613,751 A | 3/1997 | Parker et al. |
| 5,618,096 A | 4/1997 | Parker et al. |
| 5,619,217 A | 4/1997 | Mailandt et al. |
| 5,626,320 A | 5/1997 | Burrell et al. |
| 5,629,668 A | 5/1997 | Downs |
| 5,629,854 A | 5/1997 | Schulte |
| 5,635,945 A | 6/1997 | McConnell et al. |
| 5,638,513 A | 6/1997 | Ananda |
| 5,646,857 A | 7/1997 | McBurney et al. |
| 5,648,904 A | 7/1997 | Scott |
| 5,650,770 A | 7/1997 | Schlager et al. |
| 5,652,479 A | 7/1997 | LoCascio et al. |
| 5,652,706 A | 7/1997 | Morimoto et al. |
| 5,654,718 A | 8/1997 | Beason et al. |
| 5,654,886 A | 8/1997 | Zereski et al. |
| 5,655,736 A | 8/1997 | Kozloff et al. |
| 5,657,231 A | 8/1997 | Nobe et al. |
| 5,661,364 A | 8/1997 | Kruskopf |
| 5,661,632 A | 8/1997 | Register |
| 5,665,000 A | 9/1997 | Burrell et al. |
| 5,666,279 A | 9/1997 | Takehara et al. |
| 5,673,039 A | 9/1997 | Pietzsch et al. |
| D384,661 S | 10/1997 | Burrell et al. |
| 5,675,220 A | 10/1997 | Dault et al. |
| 5,680,192 A | 10/1997 | Burrell et al. |
| 5,689,269 A | 11/1997 | Norris |
| 5,689,809 A | 11/1997 | Grube et al. |
| 5,694,534 A | 12/1997 | White, Jr. et al. |
| 5,699,056 A | 12/1997 | Yoshida |
| 5,701,121 A | 12/1997 | Murdoch |
| 5,711,013 A | 1/1998 | Collett et al. |
| D390,484 S | 2/1998 | Nishimura et al. |
| 5,715,163 A | 2/1998 | Bang et al. |
| 5,717,389 A | 2/1998 | Mertens et al. |
| 5,719,824 A | 2/1998 | Boucher |
| 5,729,458 A | 3/1998 | Poppen |
| 5,732,385 A | 3/1998 | Nakayama et al. |
| 5,742,256 A | 4/1998 | Wakabayashi |
| 5,742,925 A | 4/1998 | Baba |
| 5,745,054 A | 4/1998 | Wilkens |
| 5,751,612 A | 5/1998 | Donovan et al. |
| 5,754,143 A | 5/1998 | Warnagiris et al. |
| 5,757,929 A | 5/1998 | Wang et al. |
| D395,250 S | 6/1998 | Kabler et al. |
| D395,252 S | 6/1998 | Nelson et al. |
| 5,759,049 A | 6/1998 | Gerber |
| 5,760,748 A | 6/1998 | Beckingham |
| 5,761,417 A | 6/1998 | Henley et al. |
| 5,765,169 A | 6/1998 | Conner |
| 5,768,581 A | 6/1998 | Cochran |
| 5,774,362 A | 6/1998 | Suzuki et al. |
| 5,774,826 A | 6/1998 | McBride |
| 5,774,827 A | 6/1998 | Smith, Jr. et al. |
| 5,775,791 A | 7/1998 | Yoshikawa et al. |
| 5,781,150 A | 7/1998 | Norris |
| 5,786,789 A | 7/1998 | Janky |
| 5,787,382 A | 7/1998 | Kurabayashi |
| 5,787,383 A | 7/1998 | Moroto et al. |
| 5,793,631 A | 8/1998 | Ito et al. |
| 5,798,882 A | 8/1998 | Lang |
| 5,802,366 A | 9/1998 | Row et al. |
| 5,802,492 A | 9/1998 | DeLorme et al. |
| 5,806,017 A | 9/1998 | Hancock |
| 5,808,581 A | 9/1998 | Braisted et al. |
| 5,809,447 A | 9/1998 | Kato et al. |
| 5,812,069 A | 9/1998 | Albrecht et al. |
| 5,812,591 A | 9/1998 | Shumaker et al. |
| 5,815,126 A | 9/1998 | Fan et al. |
| 5,819,201 A | 10/1998 | DeGraaf |
| 5,820,080 A | 10/1998 | Eschenbach |
| 5,825,327 A | 10/1998 | Krasner |
| 5,835,755 A | 11/1998 | Stellwagen, Jr. |
| 5,838,281 A | 11/1998 | Blaese |
| 5,839,088 A | 11/1998 | Hancock et al. |
| 5,845,227 A | 12/1998 | Peterson |
| 5,848,373 A | 12/1998 | DeLorme et al. |
| 5,848,378 A | 12/1998 | Shelton et al. |
| 5,850,612 A | 12/1998 | Kulberg et al. |
| 5,852,791 A | 12/1998 | Sato et al. |
| 5,854,608 A | 12/1998 | Leisten |
| D404,666 S | 1/1999 | Wrisley |
| 5,862,244 A | 1/1999 | Kleiner et al. |
| 5,862,509 A | 1/1999 | Desai et al. |
| 5,862,511 A | 1/1999 | Croyle et al. |
| 5,868,582 A | 2/1999 | Jacobi |
| 5,874,920 A | 2/1999 | Araki et al. |
| 5,877,724 A | 3/1999 | Davis |
| 5,878,368 A | 3/1999 | DeGraaf |
| 5,881,985 A | 3/1999 | Hoenig |
| 5,884,219 A | 3/1999 | Curtwright et al. |
| 5,888,076 A | 3/1999 | Itoh et al. |
| 5,889,364 A | 3/1999 | McGuigan et al. |
| 5,889,474 A | 3/1999 | LaDue |
| 5,889,477 A | 3/1999 | Fastenrath |
| 5,890,092 A | 3/1999 | Kato et al. |
| 5,893,081 A | 4/1999 | Poppen |
| 5,898,408 A | 4/1999 | Du |
| D409,927 S | 5/1999 | Wiegers et al. |
| 5,901,183 A | 5/1999 | Garin et al. |
| 5,902,347 A | 5/1999 | Backman et al. |
| 5,902,350 A | 5/1999 | Tamai et al. |
| 5,905,451 A | 5/1999 | Sakashita |
| 5,905,507 A | 5/1999 | Rossignac et al. |
| 5,906,825 A | 5/1999 | Seabrook, Jr. et al. |
| 5,907,293 A | 5/1999 | Tognazzini |
| 5,908,464 A | 6/1999 | Kishigami et al. |
| 5,909,672 A | 6/1999 | Madore et al. |
| 5,910,882 A | 6/1999 | Burrell |
| 5,911,773 A | 6/1999 | Mutsuga et al. |
| 5,913,917 A | 6/1999 | Murphy |
| 5,913,918 A | 6/1999 | Nakano et al. |
| 5,914,675 A | 6/1999 | Tognazzini |
| 5,914,685 A | 6/1999 | Kozlov et al. |
| 5,916,299 A | 6/1999 | Poppen |
| 5,918,841 A | 7/1999 | Sweere et al. |
| 5,922,041 A | 7/1999 | Anderson |
| 5,924,665 A | 7/1999 | Sweere et al. |
| 5,926,113 A | 7/1999 | Jones et al. |
| 5,930,200 A | 7/1999 | Kabel |
| D412,450 S | 8/1999 | McCain |
| 5,931,102 A | 8/1999 | Grahl |
| 5,931,555 A | 8/1999 | Akahane et al. |
| 5,931,888 A | 8/1999 | Hiyokawa |
| 5,936,553 A | 8/1999 | Kabel |
| 5,938,159 A | 8/1999 | Hung |
| 5,938,720 A | 8/1999 | Tamai |
| 5,938,721 A | 8/1999 | Dussell et al. |
| 5,940,776 A | 8/1999 | Baron et al. |
| 5,943,018 A | 8/1999 | Miller |
| 5,945,950 A | 8/1999 | Elbadawy |
| 5,945,956 A | 8/1999 | Izawa et al. |
| 5,946,687 A | 8/1999 | Gehani et al. |

| | | | | | | |
|---|---|---|---|---|---|---|
| 5,947,359 | A | 9/1999 | Yoshie | 6,089,520 A | 7/2000 | Wu et al. |
| 5,948,043 | A | 9/1999 | Mathis | 6,091,368 A | 7/2000 | Mitchell et al. |
| 5,951,399 | A | 9/1999 | Burrell et al. | 6,091,956 A | 7/2000 | Hollenberg |
| 5,951,620 | A | 9/1999 | Ahrens et al. | D429,173 S | 8/2000 | Laverick et al. |
| 5,952,959 | A | 9/1999 | Norris | 6,097,339 A | 8/2000 | Filipovic et al. |
| 5,953,367 | A | 9/1999 | Zhodzicshsky et al. | 6,101,443 A | 8/2000 | Kato et al. |
| 5,955,973 | A | 9/1999 | Anderson | 6,107,940 A | 8/2000 | Grimm |
| 5,955,997 | A | 9/1999 | Ho et al. | 6,107,970 A | 8/2000 | Holshouser et al. |
| 5,956,655 | A | 9/1999 | Suzuki et al. | 6,108,269 A | 8/2000 | Kabel |
| 5,959,529 | A | 9/1999 | Kail | 6,108,603 A | 8/2000 | Karunanidhi |
| 5,959,577 | A | 9/1999 | Fan et al. | 6,111,539 A | 8/2000 | Mannings et al. |
| 5,960,411 | A | 9/1999 | Hartman et al. | 6,121,923 A | 9/2000 | King |
| 5,963,130 | A | 10/1999 | Schlager et al. | 6,122,593 A | 9/2000 | Friederich et al. |
| 5,964,443 | A | 10/1999 | Leveille | 6,125,325 A | 9/2000 | Kohli |
| 5,966,645 | A | 10/1999 | Davis | 6,127,945 A | 10/2000 | Mura-Smith |
| 5,967,479 | A | 10/1999 | Sweere et al. | 6,128,515 A | 10/2000 | Kabler et al. |
| 5,969,609 | A | 10/1999 | Murdoch | 6,129,321 A | 10/2000 | Minelli et al. |
| 5,970,400 | A | 10/1999 | Dwyer | 6,133,874 A | 10/2000 | Krasner |
| 5,975,474 | A | 11/1999 | Kaplan et al. | 6,133,886 A | 10/2000 | Fariello et al. |
| 5,978,730 | A | 11/1999 | Poppen et al. | 6,141,621 A | 10/2000 | Piwowarski et al. |
| 5,982,298 | A | 11/1999 | Lappenbusch | 6,144,917 A | 11/2000 | Walters et al. |
| 5,986,616 | A | 11/1999 | Edvardsson | 6,148,262 A | 11/2000 | Fry |
| 5,987,374 | A | 11/1999 | Akutsu et al. | 6,150,961 A | 11/2000 | Alewine et al. |
| 5,987,377 | A | 11/1999 | Westerlage et al. | 6,151,550 A | 11/2000 | Nakatani |
| 5,987,380 | A | 11/1999 | Backman et al. | 6,154,184 A | 11/2000 | Endo et al. |
| 5,990,846 | A | 11/1999 | Dichter | 6,157,346 A | 12/2000 | Ho |
| 5,991,692 | A | 11/1999 | Spencer, II et al. | 6,160,523 A | 12/2000 | Ho |
| 5,995,064 | A | 11/1999 | Yanagisawa et al. | 6,161,092 A | 12/2000 | Latshaw et al. |
| 5,995,970 | A | 11/1999 | Robinson et al. | 6,163,269 A | 12/2000 | Millington et al. |
| 5,996,954 | A | 12/1999 | Rosen et al. | 6,172,641 B1 | 1/2001 | Millington |
| 5,999,882 | A | 12/1999 | Simpson et al. | 6,173,933 B1 | 1/2001 | Whiteside et al. |
| 6,002,982 | A | 12/1999 | Fry | 6,177,873 B1 | 1/2001 | Cragun |
| 6,003,024 | A | 12/1999 | Bair et al. | 6,178,380 B1 | 1/2001 | Millington |
| 6,006,076 | A | 12/1999 | Nakamura | 6,182,006 B1 | 1/2001 | Meek |
| 6,006,161 | A | 12/1999 | Katou | 6,182,010 B1 | 1/2001 | Berstis |
| 6,011,510 | A | 1/2000 | Yee et al. | 6,188,778 B1 | 2/2001 | Higashikubo et al. |
| 6,012,693 | A | 1/2000 | Voeller et al. | 6,188,955 B1 | 2/2001 | Robinson et al. |
| 6,016,485 | A | 1/2000 | Amakawa et al. | 6,188,956 B1 | 2/2001 | Walters |
| 6,021,371 | A | 2/2000 | Fultz | 6,192,257 B1 | 2/2001 | Ray |
| 6,021,406 | A | 2/2000 | Kuznetson | 6,199,008 B1 | 3/2001 | Aratow et al. |
| 6,023,245 | A | 2/2000 | Gomez et al. | 6,199,013 B1 | 3/2001 | O'Shea |
| 6,023,653 | A | 2/2000 | Ichimura et al. | 6,208,932 B1 | 3/2001 | Ohmura et al. |
| 6,026,384 | A | 2/2000 | Poppen | 6,208,934 B1 | 3/2001 | Bechtolsheim et al. |
| 6,027,257 | A | 2/2000 | Richards et al. | 6,209,026 B1 | 3/2001 | Ran et al. |
| 6,029,072 | A | 2/2000 | Barber | 6,213,438 B1 | 4/2001 | Ostby et al. |
| 6,029,111 | A | 2/2000 | Croyle | 6,215,680 B1 | 4/2001 | Rolston |
| 6,029,141 | A | 2/2000 | Bezos et al. | 6,216,064 B1 | 4/2001 | Johnson et al. |
| 6,032,219 | A | 2/2000 | Robinson et al. | 6,222,485 B1 | 4/2001 | Walters et al. |
| 6,037,942 | A | 3/2000 | Millington | 6,229,479 B1 | 5/2001 | Kozlov et al. |
| 6,038,509 | A | 3/2000 | Poppen et al. | 6,236,933 B1 | 5/2001 | Lang |
| 6,042,338 | A | 3/2000 | Brafford et al. | 6,246,958 B1 | 6/2001 | Hirono |
| 6,047,939 | A | 4/2000 | Kim | 6,252,605 B1 | 6/2001 | Beesley et al. |
| 6,049,309 | A | 4/2000 | Timoshin et al. | 6,256,029 B1 | 7/2001 | Millington |
| 6,049,755 | A | 4/2000 | Lou et al. | 6,256,577 B1 | 7/2001 | Graunke |
| 6,050,535 | A | 4/2000 | Kang | 6,262,337 B1 | 7/2001 | Von Euler et al. |
| 6,052,597 | A | 4/2000 | Ekstrom | 6,265,571 B1 | 7/2001 | Shi et al. |
| 6,052,646 | A | 4/2000 | Kirkhart et al. | 6,266,442 B1 | 7/2001 | Laumeyer et al. |
| 6,054,813 | A | 4/2000 | Takeda et al. | 6,266,612 B1 | 7/2001 | Dussell et al. |
| 6,055,479 | A | 4/2000 | Kirkhart et al. | 6,272,189 B1 | 8/2001 | Garin et al. |
| D425,499 | S | 5/2000 | Millington | 6,275,231 B1 | 8/2001 | Obradovich |
| 6,059,843 | A | 5/2000 | Kirkhart | 6,282,486 B1 | 8/2001 | Bates et al. |
| 6,067,046 | A | 5/2000 | Nichols | 6,282,495 B1 | 8/2001 | Kirkhart et al. |
| 6,076,039 | A | 6/2000 | Kabel et al. | 6,285,950 B1 | 9/2001 | Tanimoto |
| 6,076,111 | A | 6/2000 | Chiu et al. | 6,308,134 B1 | 10/2001 | Croyle et al. |
| 6,077,095 | A | 6/2000 | DelPrete et al. | 6,314,365 B1 | 11/2001 | Smith |
| 6,078,864 | A | 6/2000 | Long et al. | 6,314,368 B1 | 11/2001 | Gurmu et al. |
| 6,079,682 | A | 6/2000 | Olkkola | 6,317,684 B1 | 11/2001 | Roeseler et al. |
| D427,919 | S | 7/2000 | Laverick et al. | 6,317,686 B1 | 11/2001 | Ran |
| 6,084,543 | A | 7/2000 | Iizuka | 6,317,687 B1 | 11/2001 | Morimoto et al. |
| 6,085,090 | A | 7/2000 | Yee et al. | 6,317,689 B1 | 11/2001 | Lee |
| 6,088,000 | A | 7/2000 | Ho | 6,321,158 B1 | 11/2001 | DeLorme et al. |

| | | |
|---|---|---|
| 6,328,575 B1 | 12/2001 | Burrell |
| 6,329,946 B1 | 12/2001 | Hirata et al. |
| 6,330,149 B1 | 12/2001 | Burrell |
| 6,333,702 B1 | 12/2001 | Hiyokawa et al. |
| 6,334,087 B1 | 12/2001 | Nakano et al. |
| 6,335,905 B1 | 1/2002 | Kabel |
| 6,347,280 B1 | 2/2002 | Inoue et al. |
| 6,353,795 B1 | 3/2002 | Ranjan |
| 6,353,798 B1 | 3/2002 | Green et al. |
| 6,360,167 B1 | 3/2002 | Millington et al. |
| 6,362,751 B1 | 3/2002 | Upparapalli |
| 6,362,779 B1 | 3/2002 | Meek et al. |
| 6,363,322 B1 | 3/2002 | Millington |
| 6,370,475 B1 | 4/2002 | Breed et al. |
| 6,373,430 B1 | 4/2002 | Beason et al. |
| 6,374,177 B1 | 4/2002 | Lee et al. |
| 6,374,179 B1 | 4/2002 | Smith et al. |
| 6,374,180 B1 | 4/2002 | Slominski et al. |
| 6,377,516 B1 | 4/2002 | Whiteside et al. |
| 6,381,540 B1 | 4/2002 | Beason et al. |
| 6,384,798 B1 | 5/2002 | Barta et al. |
| 6,385,542 B1 | 5/2002 | Millington |
| 6,392,593 B1 | 5/2002 | Pemble |
| 6,397,145 B1 | 5/2002 | Millington |
| 6,400,753 B1 | 6/2002 | Kohli et al. |
| 6,401,027 B1 | 6/2002 | Xu et al. |
| 6,402,334 B1 | 6/2002 | Yu-San |
| 6,405,126 B1 | 6/2002 | Palomo et al. |
| 6,405,130 B1 | 6/2002 | Piwowarski |
| 6,407,709 B1 | 6/2002 | Hanshew |
| 6,411,502 B1 | 6/2002 | Burrell |
| 6,411,899 B2 | 6/2002 | Dussell et al. |
| 6,415,223 B1 | 7/2002 | Lin et al. |
| 6,421,609 B2 | 7/2002 | Kohli |
| 6,429,812 B1 | 8/2002 | Hoffberg |
| 6,430,501 B1 | 8/2002 | Slominski |
| 6,434,485 B1 | 8/2002 | Beason et al. |
| 6,438,561 B1 | 8/2002 | Israni et al. |
| 6,452,544 B1 | 9/2002 | Hakala et al. |
| 6,456,935 B1 | 9/2002 | Ng |
| 6,459,987 B1 | 10/2002 | Krull et al. |
| 6,463,091 B1 | 10/2002 | Zhodzicshsky et al. |
| 6,463,385 B1 | 10/2002 | Fry |
| 6,464,185 B1 | 10/2002 | Minelli et al. |
| 6,466,514 B1 | 10/2002 | Kabel |
| 6,466,862 B1 | 10/2002 | DeKock et al. |
| 6,470,268 B1 | 10/2002 | Ashcraft et al. |
| 6,483,457 B2 | 11/2002 | Hirata et al. |
| 6,484,089 B1 | 11/2002 | Millington |
| 6,492,941 B1 | 12/2002 | Beason et al. |
| 6,516,267 B1 | 2/2003 | Cherveny et al. |
| 6,526,350 B2 | 2/2003 | Sekiyama |
| 6,529,822 B1 | 3/2003 | Millington et al. |
| 6,529,824 B1 | 3/2003 | Obradovich et al. |
| 6,529,829 B2 | 3/2003 | Turetzky et al. |
| 6,532,419 B1 | 3/2003 | Begin et al. |
| 6,539,301 B1 | 3/2003 | Shirk et al. |
| 6,542,814 B2 | 4/2003 | Polidi et al. |
| 6,552,656 B2 | 4/2003 | Polidi et al. |
| 6,553,308 B1 | 4/2003 | Uhlmann et al. |
| 6,574,548 B2 | 6/2003 | DeKock et al. |
| 6,574,551 B1 | 6/2003 | Maxwell et al. |
| 6,574,558 B2 | 6/2003 | Kohli |
| 6,577,334 B1 | 6/2003 | Kawai et al. |
| 6,594,576 B2 | 7/2003 | Fan et al. |
| 6,594,617 B2 | 7/2003 | Scherzinger |
| 6,600,994 B1 | 7/2003 | Polidi |
| 6,601,012 B1 | 7/2003 | Horvitz et al. |
| 6,611,753 B1 | 8/2003 | Millington |
| 6,622,086 B2 | 9/2003 | Polidi |
| 6,674,402 B2 | 1/2004 | Hirata et al. |
| 6,680,674 B1 | 1/2004 | Park |
| 6,687,615 B1 | 2/2004 | Krull et al. |
| 6,691,031 B2 | 2/2004 | Lokshin et al. |
| 6,711,499 B2 | 3/2004 | Millington |
| 6,729,176 B2 | 5/2004 | Begin |
| 6,735,516 B1 | 5/2004 | Manson |
| 6,741,928 B2 | 5/2004 | Millington et al. |
| 6,765,554 B2 | 7/2004 | Millington |
| 6,785,606 B2 | 8/2004 | DeKock et al. |
| 6,791,472 B1 | 9/2004 | Hoffberg |
| 6,836,725 B2 | 12/2004 | Millington et al. |
| 6,845,316 B2 | 1/2005 | Yates |
| 6,850,844 B1 | 2/2005 | Walters et al. |
| 6,862,524 B1 | 3/2005 | Nagda et al. |
| 6,873,907 B1 | 3/2005 | Millington et al. |
| 6,901,330 B1 | 5/2005 | Krull et al. |
| 6,911,918 B2 | 6/2005 | Chen |
| 6,967,573 B1 | 11/2005 | Murdoch et al. |
| 7,075,459 B1 | 7/2006 | Begin et al. |
| 7,142,979 B1 | 11/2006 | Shonk |
| 7,170,518 B1 | 1/2007 | Millington et al. |
| D539,677 S | 4/2007 | Riddiford |
| 7,233,860 B2 | 6/2007 | Lokshin et al. |
| 7,248,145 B2 | 7/2007 | Littlechild et al. |
| 7,259,654 B2 | 8/2007 | Littlechild et al. |
| 2002/0077748 A1 | 6/2002 | Nakano |
| 2002/0091485 A1 | 7/2002 | Mikuriya et al. |
| 2002/0093493 A1 | 7/2002 | Micaheli et al. |
| 2002/0158922 A1 | 10/2002 | Clark et al. |
| 2002/0169551 A1 | 11/2002 | Inoue et al. |
| 2003/0139150 A1 | 7/2003 | Rodriguez et al. |
| 2003/0171870 A1 | 9/2003 | Gueziec |
| 2003/0236818 A1 | 12/2003 | Bruner et al. |
| 2004/0083037 A1 | 4/2004 | Yamane et al. |
| 2004/0104842 A1 | 6/2004 | Drury et al. |
| 2004/0243533 A1 | 12/2004 | Dempster et al. |
| 2005/0052462 A1 | 3/2005 | Sakamoto et al. |
| 2005/0099321 A1 | 5/2005 | Pearce |
| 2005/0099322 A1 | 5/2005 | Wainfan et al. |
| 2005/0248469 A1 | 11/2005 | DeKock et al. |
| 2006/0178918 A1 | 8/2006 | Mikurak |
| 2008/0119564 A1 | 5/2008 | McGlynn et al. |
| 2009/0287404 A1 | 11/2009 | DeKock et al. |
| 2010/0253544 A1 | 10/2010 | DeKock et al. |

FOREIGN PATENT DOCUMENTS

| | | |
|---|---|---|
| JP | 5-007239 | 1/1993 |
| JP | 5-011700 | 1/1993 |
| JP | 5-35903 | 2/1993 |
| JP | 5-100240 | 4/1993 |
| JP | 5-173478 | 7/1993 |
| JP | 5-173479 | 7/1993 |
| JP | 7-55910 | 3/1995 |
| JP | 8-212490 | 8/1996 |
| JP | 8-263783 | 10/1996 |
| JP | 9-259387 | 10/1997 |
| JP | 9-292834 | 11/1997 |
| JP | 9-305891 | 11/1997 |
| JP | 10-293035 | 11/1998 |
| JP | 11-31295 | 2/1999 |
| JP | 11-086184 | 3/1999 |
| JP | 11-328581 | 11/1999 |
| JP | 11-353582 | 12/1999 |

OTHER PUBLICATIONS

Atlanta Traveler Information Showcase; Mission Statement, 1996, Pittenger et al., pp. 1–44, Part 1.

Atlanta Traveler Information Showcase; Mission Statement, 1996, Pittenger et al., pp. 45–88, Part 2.

Atlanta Traveler Information Showcase; Mission Statement, 1996, Pittenger et al., pp. 89–132, Part 3.
Atlanta Traveler Information Showcase; Mission Statement, 1996, Pittenger et al., pp. 133–176, Part 4.
Atlanta Traveler Information Showcase; Mission Statement, 1996, Pittenger et al., pp. 177–219, Part 5.
DynamGuide, Presenting local traffic information using RDS/TMC, IEEE 1992, Vehicle Navigation & Information Systems, Hellaker et al., 6 pgs.
Houston Smart Commuter ITS Operational Test; FY 98 Status Report, Turnbull et al., Texas Transportation Institute, Oct. 1998, pp. 1–32, Part 1.
Houston Smart Commuter ITS Operational Test: FY 98 Status Report, Turnbull et al., Texas Transportation Institute, Oct. 1998, pp. 33–54, Part 2.
Houston Smart Commuter, U.S. Department of Transportation, Final Report, Apr. 2002, 34 pgs, Part 1.
Houston Smart Commuter, U.S. Department of Transportation, Final Report, Apr. 2002, 34 pgs, Part 2.
Houston Smart Commuter, U.S. Department of Transportation, Final Report, Apr. 2002, 33 pgs, Part 3.
TravTek System Architecture Evaluation, U.S. Department of Transportation, Publication No. FHWA–RD–94–141, Jul. 1995, 44 pgs., Part 1.
TravTek System Architecture Evaluation, U.S. Department of Transportation, Publication No. FHWA–RD–94–141, Jul. 1995, 44 pgs., Part 2.
TravTek System Architecture Evaluation, U.S. Department of Transportation, Publication No. FHWA–RD–94–141, Jul. 1995, 44 pgs., Part 3.
TravTek System Architecture Evaluation, U.S. Department of Transportation, Publication No. FHWA–RD–94–141, Jul. 1995, 44 pgs., Part 4.
TravTek System Architecture Evaluation, U.S. Department of Transportation, Publication No. FHWA–RD–94–141, Jul. 1995, 44 pgs., Part 5.
TravTek System Architecture Evaluation, U.S. Department of Transportation, Publication No. FHWA–RD–94–141, Jul. 1995, 32 pgs., Part 6.
The Development of Socrates in Europe and the Tango Filed Trial in Gothenburg, Peter Green et al., IEEE 1994, 5 pgs.
XTZ & General Logistics PLC Traffic Holdup On Motorway Alert System brochure, 1989, 8 pgs.
Smark Trek System Overview Specification, Metropolitan Model Deploymnet Initiative Project of the Washington State Department of Transportation, U S Department of Transportation, Version 2, Mar. 23, 1999, 43 pgs.
SmartTrek Metropolitan Model Deployment Initiative, Seattle Evaluation Report, Final Draft, U.S. Department of Transportation, May 2000, 40 pgs., Part 1.
SmartTrek Metropolitan Model Deployment Initiative, Seattle Evaluation Report, Final Draft, U.S. Department of Transportation, May 2000, 40 pgs., Part 2.
SmartTrek Metropolitan Model Deployment Initiative, Seattle Evaluation Report, Final Draft, U.S. Department of Transportation, May 2000, 34 pgs., Part 3.
SWIFT: Seattle Wide–area Information for Travelers Evaluation Summary, William Perez et al., Jan. 5, 1999, 28 pgs.
SWIFT: Seattle Wide–area Information for Travelers Evaluation Summary, William Perez et al., Jan. 5, 1999, 28 pgs.
SWIFT Seattle Wide–area Information for Travelers Architecture Study, Bruce Wetherby Ph.D. et al., Contract No. WSDOT Y–5908, Oct. 19, 1998, 45 pgs., Part 1.
SWIFT Seattle Wide–area Information for Travelers Architecture Study, Bruce Wetherby Ph.D. et al., Contract No. WSDOT Y–5908, Oct. 19, 1998, 45 pgs., Part 2.
SWIFT Seattle–Wide area Information for Travelers Architecture Study, Bruce Wetherby Ph.D. et al., Contract No. WSDOT–Y5908, Oct. 19, 1998, 45 pgs., Part 3.
SWIFT Seattle Wide–area Information for Travelers Architecture Study, Bruce Wetherby Ph.D. et al., Contract No. WSDOT Y–5908, Oct. 19, 1998, 45 pgs., Part 4.
Trafficmaster Look Forward to Traffic James, General Logistics Plc., 1990, 6 pgs.
Trafficmaster Non–Stop Information System, Trafficmaster, 1994, 8 pgs.
Electronics, The Maplin Magazine, Nov. 1991, vol. 11, No. 47, 6 pgs.
Cray and General Logistics Launch PC Trafficmaster, Computer Business Review, Dec. 3, 1993, 3 pgs.
Trafficmaster steers its system to GPS firms, electronicsweekly.com, Svetlana Joslfovska, Oct. 9, 1996, 1 pg.
Development of a fuzzy neural network color image vehicular detection. (FNNCIVD) system; Lan, L.W.; Kuo, A.Y.; Intelligent Transportation Systems, 2002. Proceedings. The IEEE 5th International Conference on Digital Object Identifier: 10.1109/ITSC.2002.1041194, Publication year: 2002, pp. 88–94.
Dynamic model–based techniques for the detection of incidents on freeways. Willsky, A.; Chow, E.; Gershwin, S.; Greene, C.; Houpt, P.; Kurkjian, A.; Automatic Control, IEEE Transactions on vol. 25, Issue 3, Digital Object Identifier: 10.1109/TAC.1980.1102392; Publication year: 1980, pp. 347–360.
Extracting road features from color images using a cognitive approach; Rotaru, C.; Graft, T.; Janwei Zhang; Intelligent Vehicles Symposium, 2004 IEEE; Digital Object Identifier: 10.1109/IVS.2004.1336398; Publication year: 2004, pp. 298–303.
A cooperative fuzzy control method for traffic lights; Hong Wei; Wang Yong; Mu Xuanqin; Wu Yan; Intelligent Transportation Systems, 2001; Proceedings. 2001 IEEE; Digital Object Identifier: 10.1109/ITSC.2001.948653; Publication year: 2001, pp. 185–188.
Issues of dedicated lanes for an automated highway; Hearne, R.; Siddiqui, A.; Intelligent Transportation System, 1997; ITSC '97., IEEE Conference on Digital Object Identifier: 10.1109/ITSC.1997.660545; Publication year 1997, pp. 619–624.
Image processing applied to real time measurement of traffic flow; Soto, A.; Cipriano, A.; System theory, 1996., Proceedings of the Twenty–Eighth Southeastern Symposium on Digital Object Identifier: 10.1109/SSST.1996.493520; Publication year 1996, pp. 312–316.
Vehicular tunnel traffic–flow control; Cunningham, R.F.; White, C.F.; Vehicular Technology, IEEE Transactions on vol. 19, Issue 1, Digital Object Identifier: 10.1109/T–VT.1970.23439; Publication year 1970, 9 pages.
Intelligent traffic control system for highway work zones; Pant, P.D.; Polycarpou, M.M.; Aerospace and Electronics Conference, 1995; NAECON 1995, Proceedings of the IEEE 1995 National, vol. 1; Digital Object Identifier: 10.1109/NAECON, 1995.521963; Publication year 1995, pp. 348–351, vol. 1.
Trafficmaster steers its system to GPS firms, electronics weekly.com, Svetlana Josifovska, Oct. 9, 1996, 4 pgs.

Traffic Master, Electronics The Maplin Magazine, David Holroyd, 1991, 6 pgs.

Trafficmaster non–stop information system, Trafficmaster Plc, 1994, 8 pgs.

Trafficmaster Look Forward To Traffic Jams, Trafficmaster Plc, 1990, 6 pgs.

XTZ, Traffic Hold–up On Motorway Alert System, General Logistics PLC, 1989, 8 pgs.

System Overview Specification, Smart Trek, Metropolitan Model Deployment Initiative Project of the Washington State Department of Transportation Regional and Local Agencies Commercial and Academic Partners and the U S Department of Transportation, Version 2.0, Mar. 23, 1999, 43 pgs.

Seattle Evaluation Report, Final Draft, Smart Trek, Metropolitan Model Deployment Initiative, U.S. Department of Transportation, Version 2.0, Mar. 23, 1999, 110 pgs.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 6, 10-13 and 21-34 is confirmed.

Claims 1-5, 7-9 and 14-20 are cancelled.

\* \* \* \* \*

(12) EX PARTE REEXAMINATION CERTIFICATE (10696th)
United States Patent
DeKock et al.

(10) Number: US 6,466,862 C2
(45) Certificate Issued: Aug. 28, 2015

(54) SYSTEM FOR PROVIDING TRAFFIC INFORMATION

(75) Inventors: Bruce W. DeKock, Portland, OR (US); Kevin L. Russell, Portland, OR (US); Richard J. Qian, Camas, WA (US)

(73) Assignee: TRAFFIC INFORMATION, LLC, Ilwaco, WA (US)

Reexamination Request:
No. 90/011,600, May 4, 2011

Reexamination Certificate for:
Patent No.: 6,466,862
Issued: Oct. 15, 2002
Appl. No.: 09/550,476
Filed: Apr. 14, 2000

Reexamination Certificate C1 6,466,862 issued Jun. 7, 2011

Related U.S. Application Data

(60) Provisional application No. 60/130,399, filed on Apr. 19, 1999, provisional application No. 60/166,868, filed on Nov. 22, 1999, provisional application No. 60/189,913, filed on Mar. 16, 2000.

(51) Int. Cl.
*G01C 21/26* (2006.01)
*G08G 1/01* (2006.01)

(52) U.S. Cl.
CPC .............. *G01C 21/26* (2013.01); *G08G 1/0104* (2013.01)

(58) Field of Classification Search
USPC ........................................................ 701/117
See application file for complete search history.

(56) References Cited

To view the complete listing of prior art documents cited during the proceeding for Reexamination Control Number 90/011,600, please refer to the USPTO's public Patent Application Information Retrieval (PAIR) system under the Display References tab.

*Primary Examiner* — Karin Reichle

(57) ABSTRACT

A system for providing traffic information to a plurality of mobile users connected to a network. The system comprises a plurality of traffic monitors, each comprising at least a traffic detector and a transmitter, the traffic detector generating a signal in response to vehicular traffic and the transmitter transmitting the signal. A receiver receives the signals from the traffic monitors. A computer system is connected to the receiver and is further connected to the network. The computer system in response to a request signal received from one of the users transmits in response thereto information representative of the signals transmitted by the traffic monitoring units. Alternative systems for gathering traffic information are disclosed.

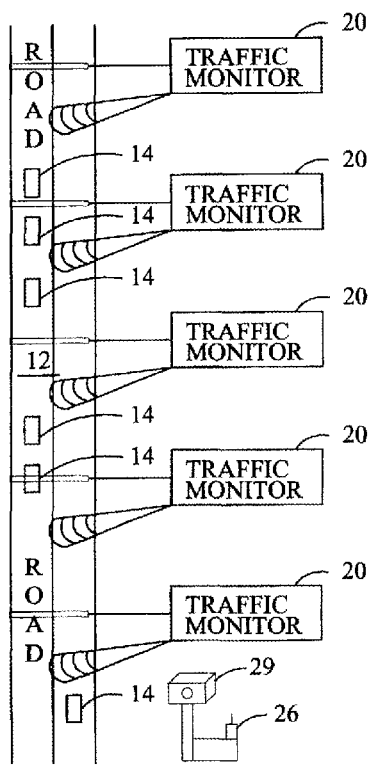

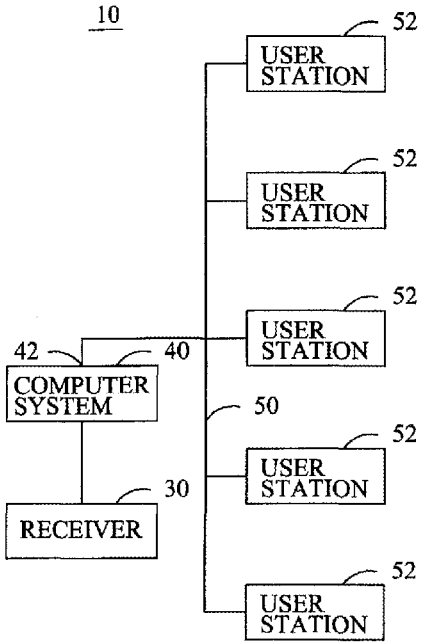

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-5, 7-9 and 14-20 were previously cancelled.
Claims 6, 10-13 and 21-34 are cancelled.

\* \* \* \* \*